Figure 4:
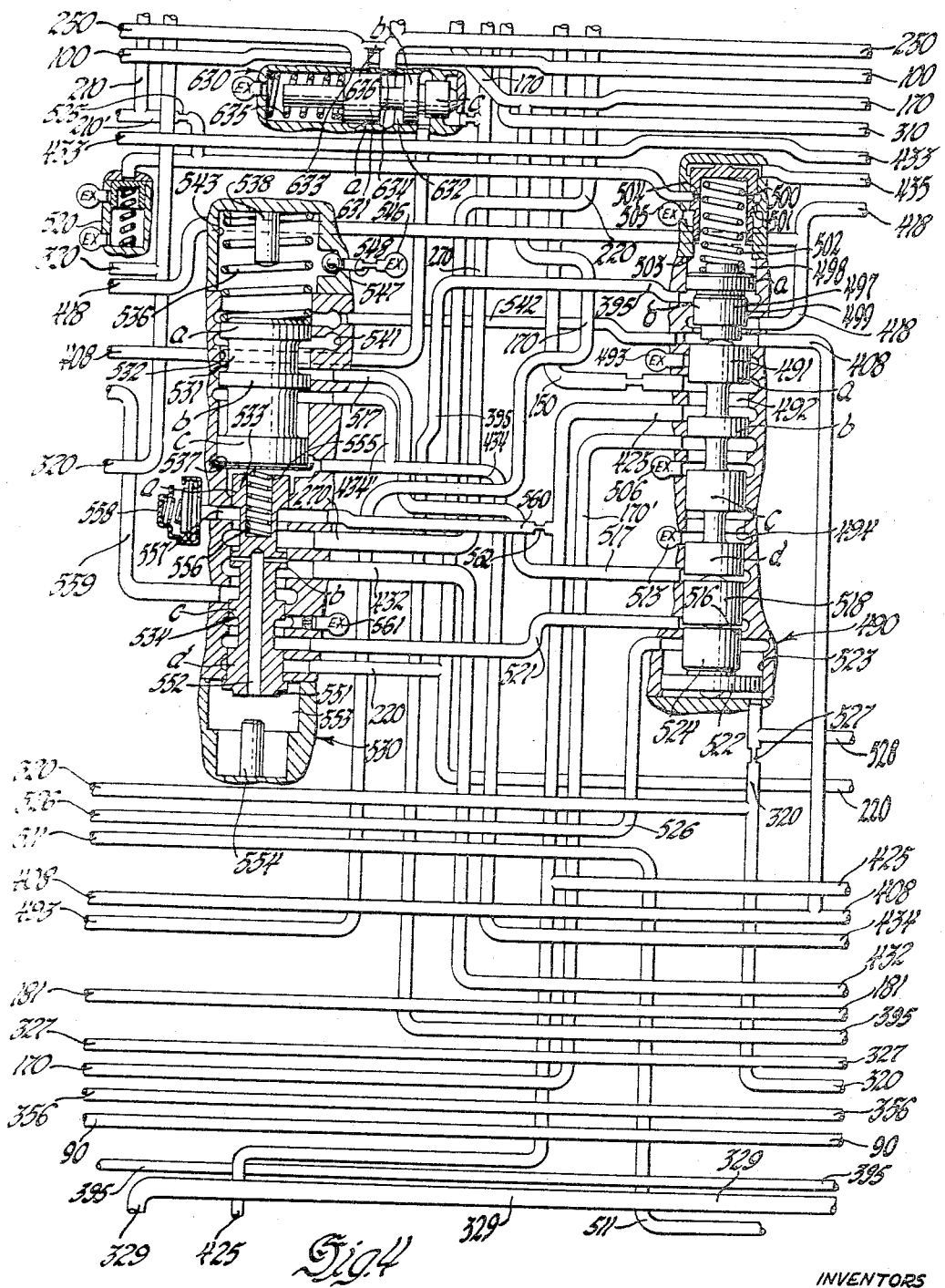

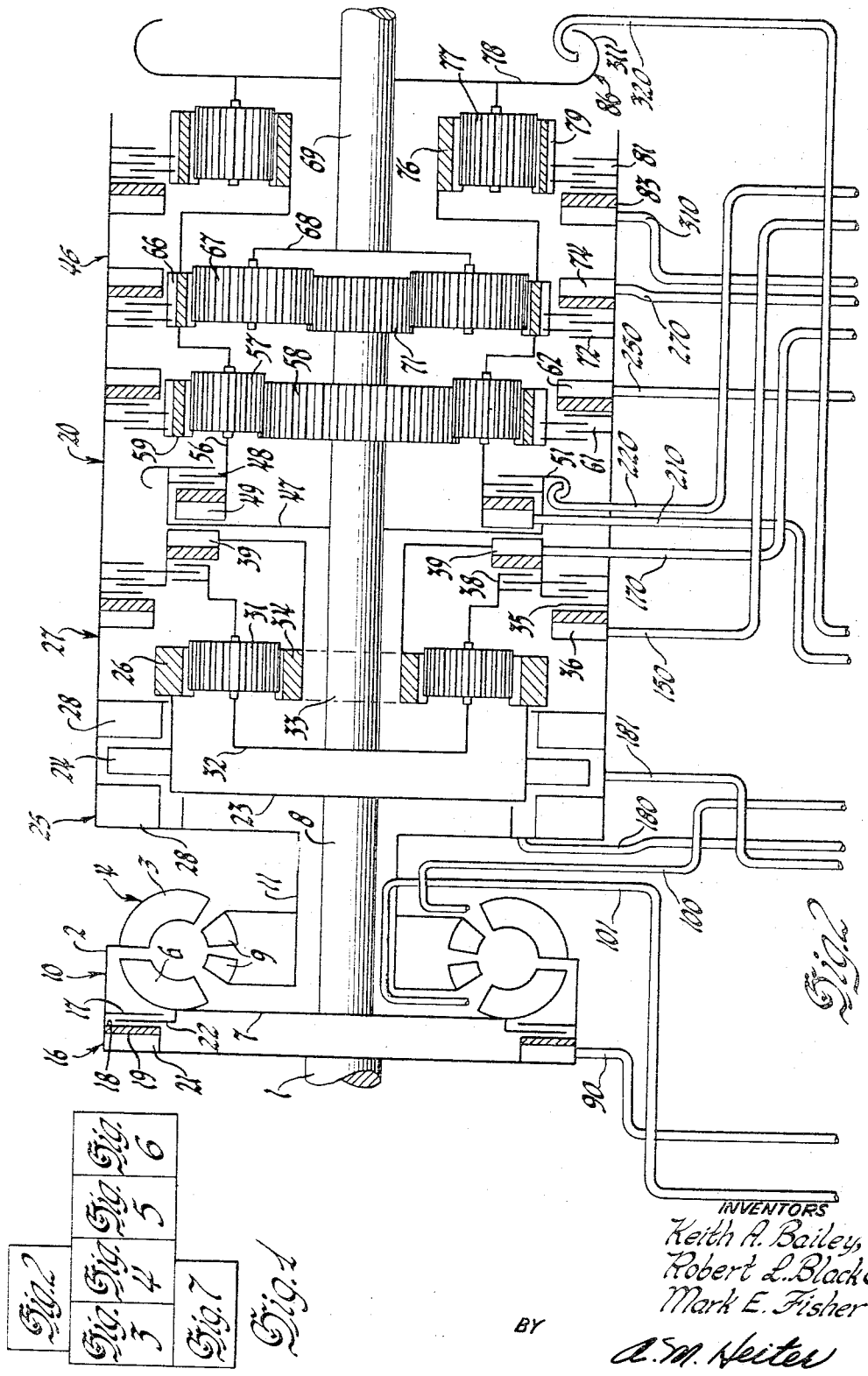

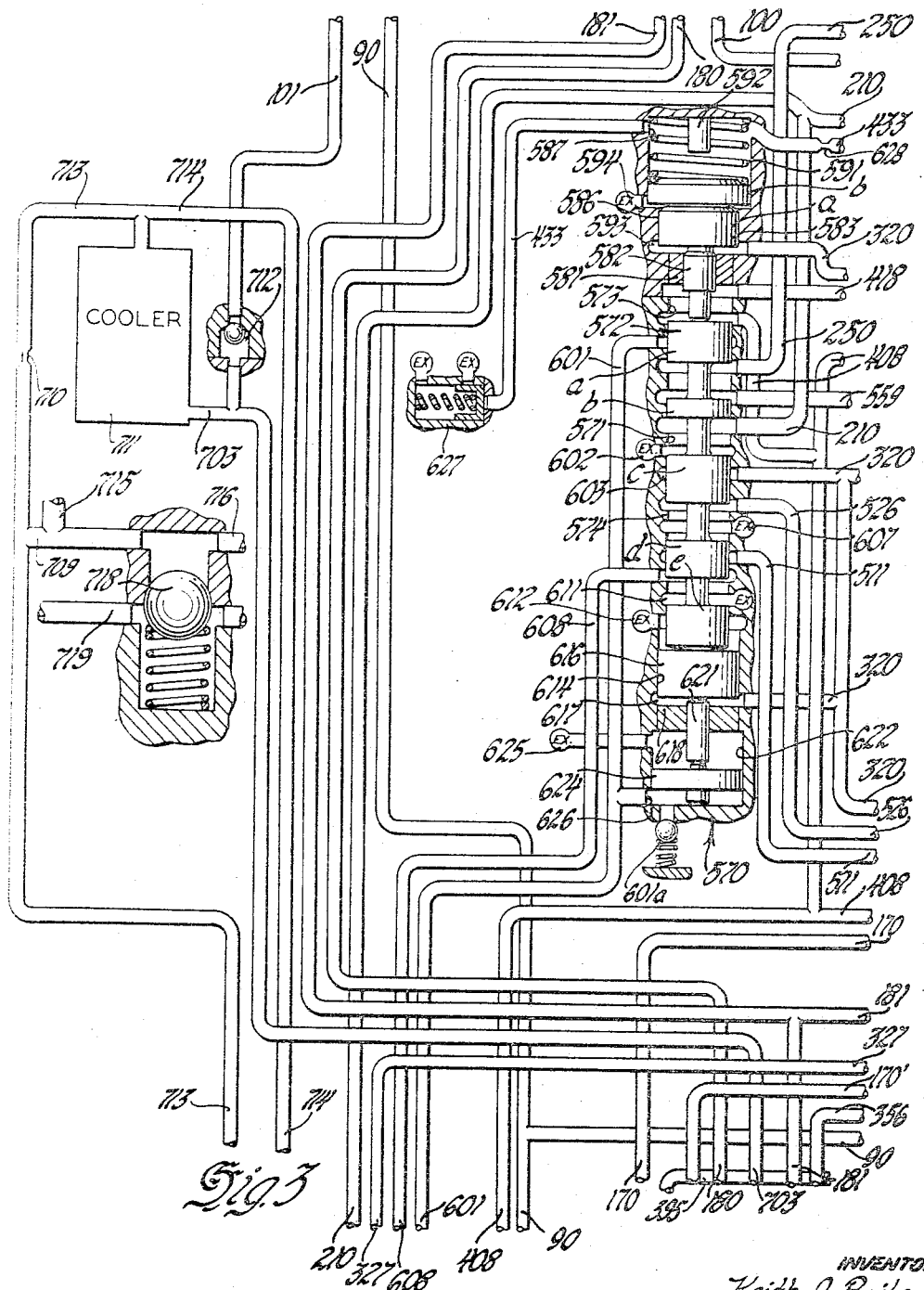

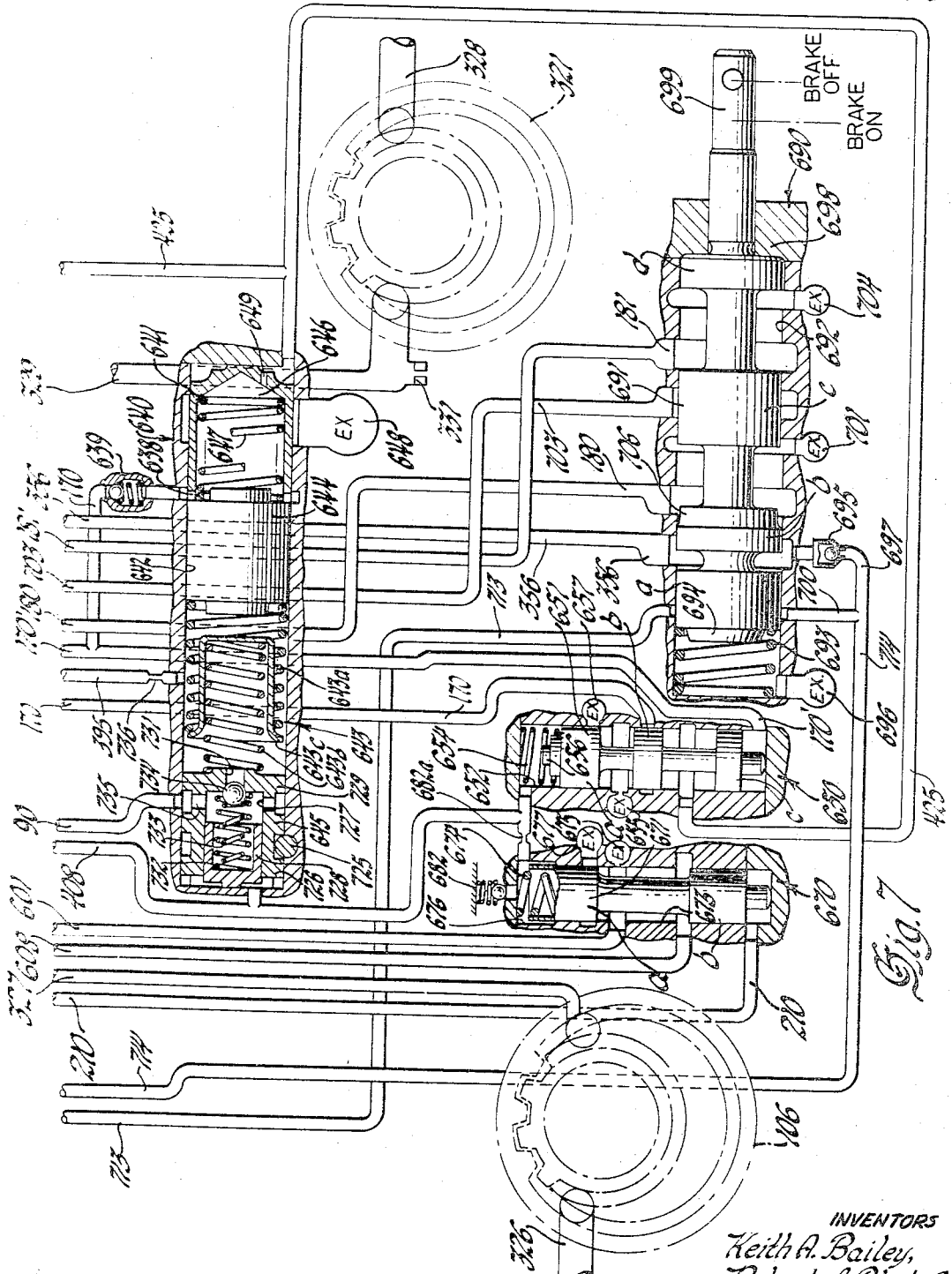

United States Patent Office  
3,313,183  
Patented Apr. 11, 1967

3,313,183  
TRANSMISSION  
Keith A. Bailey, Speedway, Robert L. Black, Indianapolis, and Mark E. Fisher, Carmel, Ind., assignors to General Motors Corporation, Detroit, Mich., a corporation of Delaware  
Filed May 4, 1964, Ser. No. 364,465  
15 Claims. (Cl. 74—752)

This invention relates to an automatic transmission and more particularly to a control system for a transmission having a multiratio gear unit and controls therefor.

The transmission drive train includes a torque converter and lockup clutch unit, a hydrodynamic brake and a six-speed and reverse gear unit. The gear unit includes a two-speed splitter unit and a three-speed and reverse unit. The control system is manually controlled for operation in a plurality of ranges in which the automatic control system will control the transmission gearing to provide drives in certain ratios in accordance with transmission speed and throttle pedal position. This application is an improvement over the assignee's co-pending application S.N. 554,866, entitled, "Transmission," filed Dec. 22, 1955, by Howard W. Christenson, Mark E. Fisher and Edward T. Mabley, now Patent No. 3,255,642, and the Christenson et al. Patent 3,053,116, entitled, "Transmission."

The transmission is controlled by the operator selectively placing the selector valve in the desired range position. The selector valve by means of a plurality of range signal pressures controls the operation of the ratio shift valves to provide a specific limited range of ratios in each range of transmission operation. This transmission provides for selection of a reverse range providing two reverse ratios, a neutral range providing a positive neutral, a drive range providing automatic shifting between third and sixth ratios, a fifth gear hold range providing automatic shifting between third and fifth ratios, an intermediate range providing automatic shifting between third and fourth ratios and a low range providing automatic shifting between the first and second ratios. Thus, when the range selector valve or manual valve is downshifted from a high range position to a lower range position, forced downshift of the transmission into a lower gear ratio may be caused. If the transmission is downshifted to a lower range and thus a lower ratio at speeds greatly in excess of those normally encountered in this lower ratio, there would be excessive shock loads and speed which would damage the transmission and other vehicle components. To prevent this type of abuse, downshift inhibitor valves have been incorporated in the control system to prevent the manual control system effecting a downshift at excessive speeds on a sixth to fifth range shift, on a sixth or fifth range to intermediate range shift and on a sixth or fifth or intermediate range shift to low range. The forced downshift to the fifth gear hold range is inhibited by an inhibitor valve or a pressure control valve located in the fifth gear hold line which acts on the splitter shift valve to normally downshift the splitter shift valve to provide a sixth to fifth ratio shift. However, at excessive speeds, governor pressure being high is not overcome by the regulated fifth gear hold pressure. Similarly downshift to intermediate range is inhibited by limiting the pressure in the intermediate range line which acts to downshift the intermediate high shift valve to a value preventing downshift at excessive speeds. The downshift to low range is inhibited by a governor control valve which blocks the low range line at excessive speeds.

Another object of the invention is to provide in a transmission having a plurality of drive ratios, automatic speed controlled shift valving for controlling these ratios in response to speed, a manual valve controlling the automatic shift valving to provide selected groups of ratios in each of a plurality of positions, and inhibitor valves limiting the control pressure supplied by said manual valve and connected to said automatic shift valving to inhibit the downshift action at excessive speeds.

Another object of the invention is to provide in a transmission having a plurality of drive ratios and control means for selecting the drives in response to speed, manual means for applying a downshift control fluid pressure to said shift valves to provide a forced downshift, an orifice in the line connecting the downshift control fluid pressure to the shift valve to provide a downshift and an inhibitor valve for limiting the downshift control pressure in the line between the orifice and the shift valve to prevent a forced downshift at excessive speeds.

Another object of the invention is to provide in a transmission having a plurality of drive ratios, a plurality of automatic speed controlled shift valves for controlling the transmission to provide a plurality of ratios, manual means for controlling the supply from one shift valve to another shift valve to downshift the other shift valve including an orifice and an inhibitor valve limiting the pressure between the orifice and the other shift valve to prevent a downshift of the other shift valve at excessive speeds.

Another object of the invention is to provide in a transmission having a plurality of drive ratios, a plurality of automatic speed controlled shift valves for controlling successive groups of ratios, a manual valve control for selectively enabling operation of selected shift valves to provide selected groups of ratios, and improved means operative for disabling said manual valve control so that it is unable to select for operation a shift valve where effecting a lower group of transmission ratios would cause excessive speed.

These and other objects of the invention will be more apparent from the following description and drawings of the preferred embodiment of the invention.

The drawing diagrammatically shows the transmission and control system with FIGURES 2, 3, 4, 5, 6 and 7 arranged in accordance with the schematic diagram shown in FIG. 1.

*Transmission drive train*

The drive train illustrated diagrammatically in FIG. 2 includes a torque converter and lockup clutch unit 10, a hydrodynamic brake 25, and a six-speed and reverse gear unit 20. The engine or input shaft 1 is connected to drive the rotary torque converter housing 2 which carries the bladed pump or impeller 3 of the torque converter 4. The torque converter pump hydrokinetically drives the bladed turbine 6 which is mounted by disc 7 on the converter output shaft 8. The torque converter 4 also has two stators 9 which may be mounted by suitable one-way devices (not shown) on the ground sleeve 11. Fluid is supplied to the operating chamber of the converter by the converter inlet line 100 and exhausted by the outlet line 101 which are connected to the control system as explained below. The torque converter 4 provides in a conventional manner a shockless torque multiplying drive between the input shaft 1 and converter output shaft 8.

The input shaft 1 may also be connected to the converter output shaft 8 by the direct drive or lockup clutch 16. The direct drive clutch 16 consists of a plate 17 fixed on the rotary housing 2 and an axially movable plate 18 formed as a face of the annular piston 19 non-rotatably located in the cylinder 21. The driven plate 22 is located between the fixed plate 17 and the movable plate 18 and connected by disc 7 to shaft 8. When fluid is supplied through the lockup clutch line 90 to the motor consisting of piston 19 and cylinder 21, the driven clutch plate 22 is engaged between the movable plate 18 and fixed plate 17 to engage the direct drive clutch 16.

The converted output shaft 8 is connected by disc 23 to drive the rotary vanes 24 of hydrodynamic brake 25 and the input ring gear 26 of splitter gear unit 27. The rotary vanes 24 are located between two rows of fixed vanes 28 mounted within the brake chamber at each side of the rotary vanes. Fluid is supplied to the hydrodynamic brake chamber by inlet line 180 which is connected to the center of the brake and removed from the brake by the outlet line 181 which is connected at the perimeter of the brake chamber. The centrifugal action of the brake provides an outlet line pressure proportional to the torque absorbed by the brake due to the location of the outlet at the radial outer region of the brake chamber.

The converter output shaft 8 drives the input ring gear 26 of the planetary splitter gear unit 27 which meshes with planetary pinions 31 which are mounted on a carrier 32 secured to the connecting shaft 33. The splitter gear unit 27 is controlled by the sun gear 34 which meshes with the planetary pinions 31. To provide low or underdrive, the sun gear 34 is held by the brake or ratio engaging device 35 when actuated by motor 36 which, like all the motors in this transmission, consists of a piston and cylinder. The motors or the associated brakes or clutches for each ratio engaging device may have conventional retraction springs (not shown). The motor 36 is actuated by fluid supplied by the splitter underdrive line 150. The splitter unit 27 is placed in high or direct drive by engaging the clutch or ratio engaging device 38 which fixes the sun gear 34 to the connecting shaft 33. The clutch 38 is engaged by the motor 39 when fluid is supplied by the splitter direct line 170.

The splitter gear unit 27 is connected by the connecting shaft 33 to the three-speed and reverse planetary gear unit 46. The connecting shaft 33 is connected by driving element 47 to the high clutch or ratio engaging device 48 which is actuated by the high motor 49 supplied by the high ratio line 210.

The front pitot tube governor 51 has a can mounted on driving element 47 and a pitot tube on the housing to supply fluid to the front pitot governor line 220 at a pressure proportional to the speed of the splitter gear output or connecting shaft 33. The high clutch 48 rotates with element 47 and connects the driving element 47 to the carrier assembly 56. The carrier assembly includes the intermediate planetary pinions 57 which mesh with the intermediate sun gear 58 fixed to shaft 33 and intermediate ring gear 59. To provide intermediate ratio, the intermediate ring gear 59 is stopped by ratio brake or ratio engaging device 61 when actuated by the intermediate motor 62 under the control of fluid supplied by the intermediate clutch line 250. The carrier assembly 56 also includes the low ring gear 66 which meshes with the planetary pinions 67 mounted on carrier 68 fixed to output shaft 69. The low sun gear 71 fixed to shaft 33 meshes with planetary pinions 67. Low ratio is provided by stopping the ring gear 66 and incidentally the carrier assembly 56, by means of the low ratio brake or ratio engaging device 72 which is actuated by the motor 74 when pressure is supplied by the low clutch line 270.

The carrier assembly 56 also includes the reverse sun gear 76 which meshes with the reverse pinions 77 rotatably mounted on carrier 78 fixed to output shaft 69. The reverse ring gear 79 is held stationary for reverse drive by ratio brake or ratio engaging device 81 when engaged by motor 83 on the supply of fluid by the reverse clutch line 310.

The rear pitot governor 86 has a can mounted on carrier 78 to rotate with the output shaft 69 and a pitot tube fixed on the housing to supply the rear governor line 320 with a pressure proportional to output shaft speed.

*Transmission gearing operation*

This gearing arrangement provides six forward speed ratios and two reverse ratios by combining the two-speed ratios of the two-speed or splitter gear unit 27 and the three ratios and reverse of the three-speed and reverse unit 46. The splitter gear unit 27 has an input ring gear driven by the torque converter 4. When ratio device 35 is engaged to stop sun gear 34, the output pinions 31 and shaft 33 are driven at a reduced speed or underdrive ratio. When clutch 38 locks sun gear 34 to connecting shaft 33, the splitter gear is locked up to provide a high ratio or direct drive. The three-speed unit provides low ratio when the low ratio device 72 is engaged to hold low reaction ring gear 66 so that the input sun gear 71 drives pinions 67 and output shaft 69 at a reduced speed for low ratio. When intermediate ratio device 61 is engaged, the three-speed unit functions as a dual planetary gear. The intermediate reaction ring gear is held and the input sun gear 58 drives carrier 56 which rotates low ring gear 66 to drive, in conjunction with input sun gear 71, the output pinions 67 and shaft 69 at an intermediate ratio. High ratio is provided by engaging the high ratio device 48 to lock the carrier 56 to connecting shaft 33 to lock up the three-speed unit for direct drive or high ratio. Each of the six ratios is provided by engaging one ratio in the splitter gear unit 27 and one ratio in the three-speed unit and disengaging the other ratios. When the low ratio device 72 is engaged to provide low ratio in the three-speed unit 46, the transmission may be placed in either first ratio by placing the splitter gear unit 27 in underdrive by engaging device 35 or in second ratio by placing splitter gear unit 27 in direct drive by engaging device 38. When the three-speed unit 46 is placed in intermediate ratio by engaging device 61, the transmission may similarly be placed in third and fourth ratios by again engaging the underdrive or the direct drive respectively of the splitter gear unit 27. When the transmission is shifted to high ratio in the three-speed unit 46, the transmission may be placed in fifth ratio by shifting the splitter gear unit to underdrive and sixth ratio by shifting the splitter gear unit to direct drive. When the transmission is in reverse, the splitter unit may be upshifted to provide reverse one (R1) and reverse two (R2).

*Controls*

The hydraulic control and lubrication system for this transmission is supplied with oil under pressure by the engine driven front pum 106 and output shaft driven rear pump 321 (FIG. 7). The front pump 106 draws the fluid, such as oil, via inlet line 326 from the transmission sump and is connected to deliver oil to the front pump line 327. The rear pump 321 draws oil from the sump through the inlet 328 and delivers oil to the rear pump line 329. An orifice bleed 331 in line 329 feeds the rear governor can 311 and regulates the pressure in the rear pump line 329 proportional to pump speed or output shaft or vehicle speed to provide a second output speed responsive governor pressure. The rear pump 321 is primed by an orificed connection 322 (FIG. 5) between the front pump supply line 327 and rear pump line 329.

Figure 5:
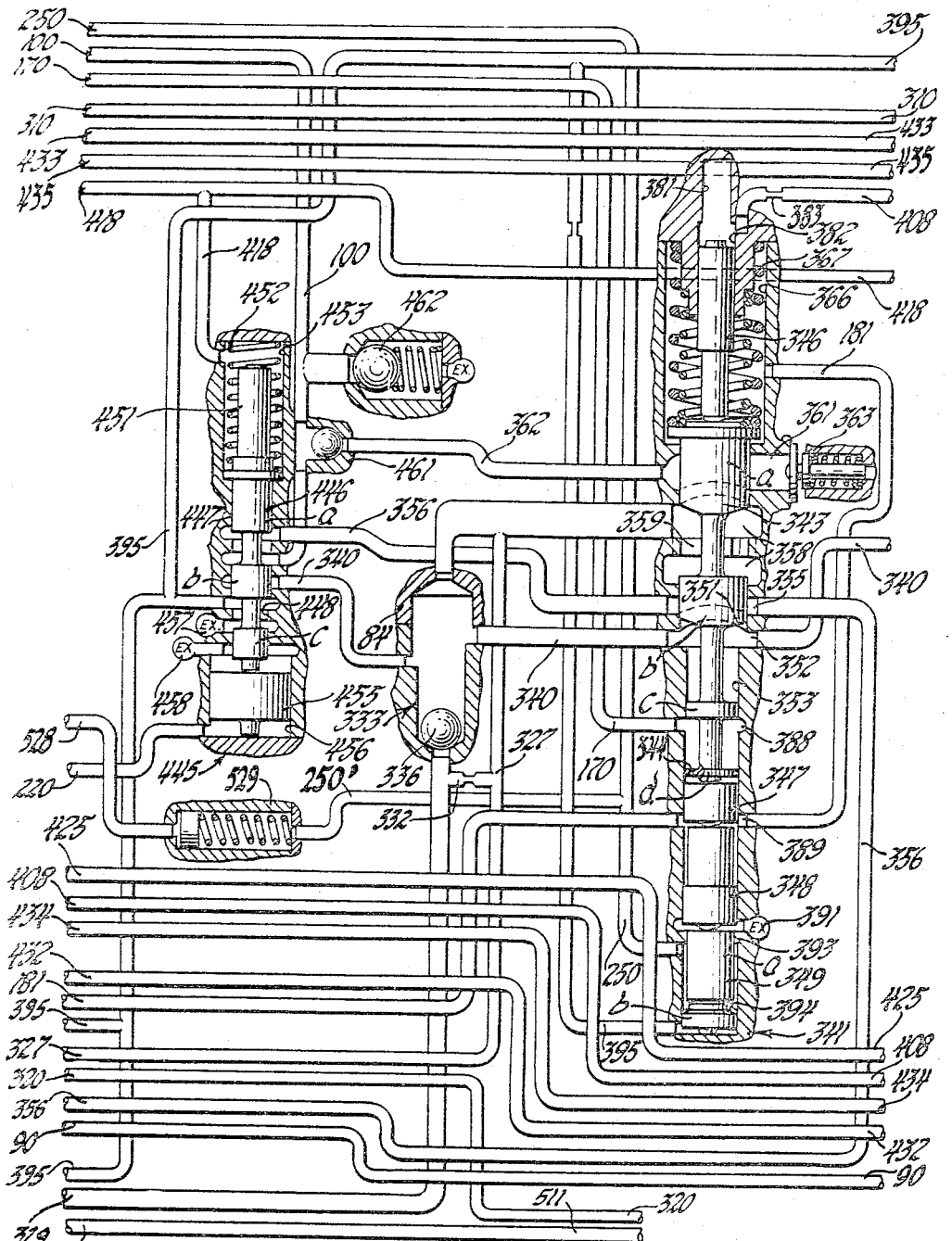

Referring to FIG. 5, the front pump line 327 is connected to the bore of check valve 333 and the rear pump line 329 is connected through ball check valve 336 to the bore of valve 333 which is connected to main line 340 to permit either pump to supply oil to the control system. The pressure in main line 340 is regulated by pressure control unit 341.

*Pressure control unit*

The pressure control unit 341 consists of a regulator valve 343 which is controlled by a throttle pressure regulator plug 346, brake regulator plugs 347 and 348 and lock-up knockdown plug 349. Regulator valve 343 has a large land $a$ at the upper or exhaust end, a large central land $b$ and smaller lands $c$ and $d$ at the other end. The lands $a$ and *b* fit in the large diameter portion 351 of the valve bore located above the port 352 for main line 340. The lands *c* and *d* fit in the smaller diameter bore portion 353 located below the port 352. The land *d* has an orifice 344 or a clearance in the bore to permit limited flow past the land. The main line 340 is always open via the port 352 through the valve. When the valve is in the closed position, as illustrated in FIG. 5, the land *b* closes port 355 for the secondary line 356 which feeds the converter and brake. Oil supplied by the main line 340 fills the space between the unbalanced lands *b* and *c* and tends to move the valve up to uncover the port 355 to supply oil to the line 356. The port 358 located between the balanced lands *a* and *b* of valve 343 is connected to the front pump line 327. With the valve in the closed position shown, the exahust from port 358 to port 361 is blocked by land *a*, but in exhaust position line 327 is connected via port 358 to port 361. The exhaust from port 361 is connected to low pressure line 362 to provide a low pressure feed for the converter when the lockup valve 445 (FIG. 5) has moved to engage the lockup clutch 16. A low pressure is maintained in the port 361 by the pressure relief valve 363 which controls the exhaust from port 361. Above regulator valve element 343 there is a spring chamber 366 which provides an abutment at one end for dual spring 367 acting upon the free end of the land 343a to urge the valve 343 toward the closed position against the fluid force acting on the unbalanced area of lands *b* and *c*.

When the oil in main line 340 between the unbalanced areas between lands *b* and *c* raises valve 343, the first increment of movement permits flow of oil to secondary line 356. When the pressure in the main and secondary lines has reached a desired value, the valve will raise and land *a* opens the port 361 and connects the front pump line 327 through port 358 directly to exhaust port 361 to supply the low pressure feed line 362 and exhaust excess oil through the pressure relief valve 363 to sump.

The regulated pressure in main line 340 is increased by the hydrodynamic brake pressure and the throttle valve pressure. The brake outlet pressure which is proportional to the torque being absorbed by the brake is conveyed by line 181 to spring chamber 366 and acts on the free end of land *a* of valve 343 to assist the spring 367 to increase the regulated line pressure. The throttle pressure, proportional to the throttle pedal position as explained below in the description of the throttle valve unit 401 (FIG. 6), is supplied by line 408 to the bore portion 382 to act downwardly on the plug 346 in bore 382 and pressure regulator valve 343 assisting spring 367 and thus increasing the pressure in main line 340. An orifice 383 in the throttle line 408 connected to bore 382 damps and delays sudden variations in throttle pressure to prevent rapid changes in main line pressure. The plug 346 provides a stop to limit the upward movement of valve 343. When the brake pressure supplied by line 181 to spring cavity 366 increases the regulated pressure in line 340 by acting in a downward direction on the free end of land *a* of valve 343, the brake pressure also acts upwardly on the plug 346 and partially or fully counteracts the pressure increasing effect due to the throttle pressure on plug 346 to prevent an excessive increase in main line pressure due to abnormal simultaneous use of brake and throttle. As explained below, the brake pressure also acts on the smaller area of plug 347 to decrease the main line pressure providing a net pressure increasing effect of a small value.

The splitter high clutch pressure supplied by line 170 and port 388 acts on the land *c* of regulator valve 343 to oppose spring 367 and lower the regulated main line (340) pressure and on both sides of land *d* through communicating orifice 344 to damp the action of the splitter high pressure on the regulator valve 343 and movement of the regulator valve 343. The brake outlet pressure in line 181 via port 389 acts upon the lower end face of plug 347 to oppose the spring 367 and reduce the regulated pressure. The brake pressure simultaneously acts on the larger area of land 343a and the smaller area of plug 347 to provide a small net increase of main line pressure. The governor controlled lockup clutch pressure in feed line 395 acts upon the lower face of land *b* of plug 349 against the spring 367 to reduce line pressure. Since the plugs are arranged in series, the effective force on the regulator valve 343 to reduce pressure will only be as large as the largest of these three fluid forces acting on their respective plugs. The intermediate clutch pressure supplied by line 250 below seal 393 acts on the upper face of land *b* of the plug 349 with the spring 367 but is only effective to oppose the pressure in feed line 395 acting upon plug 349 to partially reduce the effect of this pressure so that the governor controlled lockup pressure will not reduce the regulated line pressure as much in intermediate ratio as in other ratios.

*Throttle valve unit*

The throttle valve unit 401 (FIG. 6) supplies a throttle pressure and a downshift pressure responsive to the throttle pedal position to control the shift valves. The throttle valve unit 401 has a throttle regulator valve 403 and a downshift valve 411 in bore 402. When the engine fuel feed control, such as a throttle pedal and lever 414, is in the closed position, the valve unit 401 is in the closed position illustrated. Then the throttle valve 403, having lands *a* and *b*, is located in the bore 402 so that the upper land 403a blocks flow of oil from the main line 340 to the bore 402, but provides an annular passage around the land 403a and always connects the main line 340 to the lockup cutoff valve unit 465. When the valve is in the closed position the space between the lands *a* and *b* connects the throttle line port 406 to exhaust port 407 to exhaust the throttle pressure in line 408. The throttle line 408 is also connected to the port 409 adjacent the closed end of the bore 402 so that the throttle pressure acts down on land *a*.

The downshift valve 441 has lands *a* and *b* of equal diameter spaced from one another and located in the bore 402 and a land *c* of larger diameter at the other end spaced from land *b* that enters bore 423. The throttle valve unit 401 is controlled by the throttle pedal actuated lever 414 which engages the end face of land *c* to move the downshift valve 441 into the bore 402 and increase the bias of spring 415 on the throttle regulator valve 403 to provide a regulated throttle pressure in line 408 increasing with throttle position. Valves 403 and 411 have extensions projecting within the coil spring 415 which provide a locating device for the coil spring and a stop means to prevent the spring being compressed beyond its elastic limit. The throttle line 408 is also connected to port 416 which is normally closed by the land *a* of valve 411 when the throttle pedal is in the closed or an intermediate position. When the valve 411 reaches the downshift position which may be at high throttle, full throttle or just beyond full throttle position, the space between the lands *a* and *b* connects throttle pressure line 408 via port 416 to port 417 which connects throttle pressure, now at a maximum but less than line pressure, to the downshift line 418. The port 417 is also connected to an orifice exhaust port 421. The orifice is small so that the pressure in line 418 is not materially reduced and it downshifts the shift valves. However, when the detent line 418 is closed by the land *a* of valve 411, the trapped oil will drain to exhaust 421 to prevent oil in line 418 interfering with the action of the shift valves. At the same time or just before the throttle pressure line 408 is connected to the downshift line 418, the port 422 connected to throttle line 408, now at line pressure, is open to the space between lands *b* and *c* and the oil tends to flow into the large open end portion 423 of bore 402 and, substantially simultaneously, the large land *c* of downshift valve 411 enters bore 423 to provide a fluid detent action. It will thus be seen that further movement of the valve 411 requires an additional force to overcome the force of the pressure in throttle line 408 acting on the unbalanced area between the lands b and c of valve 411. Thus the operator will be required to exert an extra force on the throttle pedal to energize the downshift line 418 to effect a downshift. The shoulder 429 on land c limits movement of the valve 411. The throttle valve unit 401 provides throttle pressure in line 408 directly proportional to the throttle pedal position and a downshift pressure in line 418 effective at a certain point of throttle movement such as high or full throttle or slightly beyond full throttle to effect a downshift.

Speed governors

The splitter output or connecting shaft 33 drives the front pitot governor 51 (FIG. 1) to provide a governor pressure in line 220 proportional to the speed of shaft 33. The rear pitot governor 86 has a trough 311 driven by the output shaft 69 and provides a pressure in line 320 proportional to the output shaft speed. These governor pressures and the above-described throttle pressure and downshift pressure are employed to control the automatic shift valves to provide automatic speed ratio changes.

Manual valve

Figure 6:
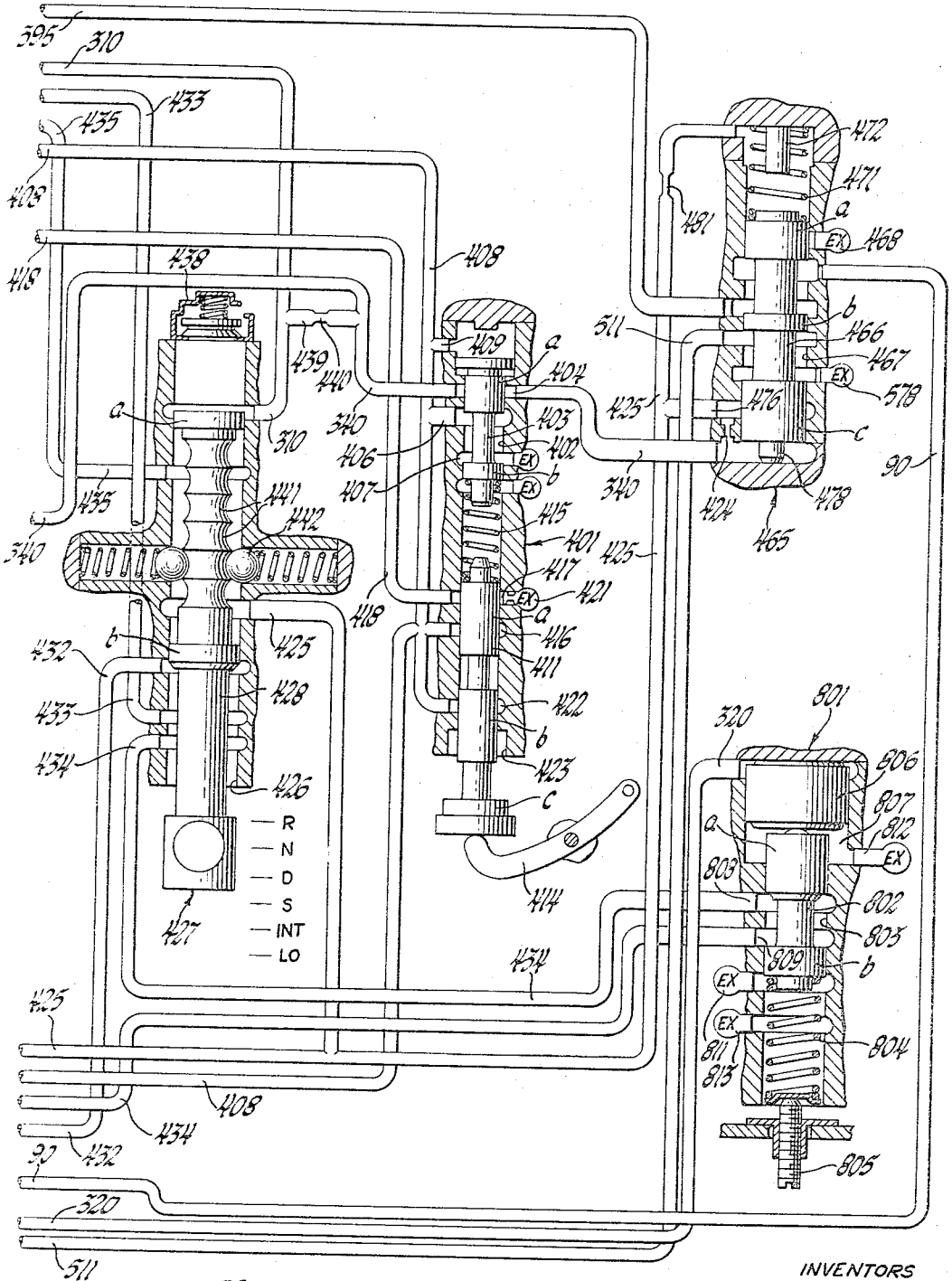

The operator positions the manual valve unit 427, FIG. 6, to select one of the ranges, Reverse, R, Neutral, N, Drive, D, Fifth Gear Hold, 5, Intermediate, Int, or Low, Lo, in which the transmission may be automatically controlled. The oil in main line 340 flows through orifice 424 or the lockup cutoff valve unit 465 (FIG. 6), as explained below, depending on the position of the lockup cutoff valve unit, to the ratio change line 425 which is connected to the bore 426 of manual valve unit 427. The valve 428 is slidably mounted in the bore 426 and has lands 428a at the top end and land 428b at the center and is connected to a manual control linkage. With the valve in the neutral position illustrated, the controlled main line 425 enters the bore 426 and is connected between lands a and b to drive signal line 435. Upward movement of the valve 428 to the reverse position R will connect line 425 to reverse line 310. Movement of the valve 428 downwardly to the drive range position D connects the controlled main line 425 via the space between the lands a and b to the drive range line 432 and drive signal line 435 which prevents disabling the splitter shift valve unit 490. In fifth gear hold position (5) main line 340 remains connected to drive range line 432 but is disconnected from drive signal line 435 to permit high ratio line 210 to disable the splitter shift valve 490 to hold the transmission in fifth ratio as explained below in connection with the splitter shift valve unit 490. Further movement of the valve 428 to the intermediate range position INT will similarly connect the control line 425 to both the drive range line 432 and the intermediate range line 433 and movement of the valve to the low position LO will connect controlled line 425 to the drive range 432, the intermediate range line 433 and the low range line 434. In each position the other lines are exhausted. When the valve 428 is in the neutral position, it will be seen that the reverse line 310 is connected to exhaust through exhaust valve 438, and the lines 432, 433 and 434 for the various drive ranges are connected to a free exhaust at the other end.

The reverse exhaust valve 438 maintains a very low pressure just to fill reverse clutch line 310 and motor 83 but insufficient to move the motor against the retraction springs. Leakage is replaced through orificed reverse makeup line 439 and orifice 440 which connects the regulated line 340 with reverse line 310. The orifice 440 limits the flow to the approximate quantity to make up for leakage in the reverse clutch motor. The valve 428 has a series of annular grooves 441, one for each valve position, which cooperate with the spring-loaded ball detents 442 to resiliently hold the valve in the selected range positions.

Second ratio downshift inhibitor valve

The second ratio downshift inhibitor valve 801 (FIG. 6) inhibits a forced downshift to second ratio when this would cause the transmission and/or engine to operate at excessive speeds. The valve 801 has a valve element 802 having lands a and b located in a bore 803. A spring 804 mounted on an adjustable abutment 805 biases the valve element to the open position against the governor force due to rear governor pressure in line 320 action on governor plug 806 in bore 807 acting on the valve element. Valve 801 is placed in line 434 with the port 808 connected to line 434 originated at the manual valve and port 809 connected to the continuing line 434 to the low intermediate valve 530. With valve 801 opened, line 434 is connected via ports 808 and 809 to the low intermediate valve 530 and at excessive speeds the governor pressure acting on plug 806 moves valve element 802 to the closed position with land a blocking port 808 and connecting the low intermediate valve 530 via line 434 and port 809 to exhaust 811 to prevent an engagement of second ratio. Exhausts 812 and 813 vent the space between the governor plug and valve element and the spring chamber.

Lockup valve unit

The lockup valve unit 445 (FIG. 5) automatically controls the lockup clutch 16 and the converter pressure. The main line 340 is connected to the lockup valve unit 445. The lockup valve 446 has an end land a, a central land b having the same diameter slidably mounted in a bore 447 in the valve body, and a land c adjacent the other end of smaller diameter which fits in a smaller diameter bore portion 448. The valve 446 has a stud 451 extending above land a which serves to limit the upward or opening movement of the valve 446 and locate spring 452 in the spring chamber 453. The spring 452 engages the end of chamber 453 and the valve to resiliently urge the valve 446 in a closing direction. The throttle pressure and forced downshift pressure are connected by the downshift line 418 to the spring chamber 453 to act on the free end of land 446a and close valve 446 to tend to disengage the lockup clutch. The front governor pressure in line 220 acts on the lower face of the lockup plug 455 located in an enlarged portion 456 of the bore 447 to move valve 446 toward open position. When the valve is in the closed position, illustrated in FIG. 5, the land b blocks the main line 340 and the controlled lockup feed line 395 is connected to the exhaust 457. Exhaust 458 vents the space between valve 446 and plug 455. The secondary line 356 is connected to the converter inlet line 100. When the converter is functioning full regulated main line pressure is supplied to the secondary line 356 and connected to the converter inlet line 100. Due to the normal flow of oil in line 100 through the converter and cooler 711, the pressure in converter inlet line 100 is lower than main and secondary line pressure. However, if flow in line 100 is restricted, for example, by cold oil in the cooler 711, the converter charging pressure could rise to main line pressure which is too high. The converter pressure regulator valve 462 limits the converter charging pressure in line 100 at a value between normal converter charging pressure and main line pressure to prevent an excessive converter charging pressure.

The lockup valve 446 is controlled by spring 452 and the throttle pressure in line 408 acting via downshift line 418 to close the valve against the front governor pressure in line 220 acting to open the valve. When the governor pressure increases sufficiently due to the increase in the intermediate shaft speed to overcome the spring force and the throttle pressure, the valve 446 moves and land b uncovers the main line 340 and permits oil under pressure to flow between lands 446b and c to act on the unbalanced area of lands b and c to tend to hold the valve 446 open to prevent hunting and to provide a hysteresis loss so that a downshift will only occur at a lower speed. With valve 446 in the open position, the main line 340 is connected to the lockup clutch feed line 395 and to the lockup cutoff valve 465 which connects to the lockup clutch line 90 except during a shift as explained below. At this time the land c closes exhaust port 457.

Since the converter 4 is inoperative when the lockup clutch 16 is engaged, except during brief shift intervals, the lockup valve is used to reduce the converter pressure when valve 446 is opened to engage lockup clutch 16. When the lockup valve 446 is opened, the land b closes the converter inlet line 100, and stops the flow of the oil from the secondary line 356 to the converter inlet line 100. The pressure in the converter thus drops until it reaches a lower value maintained in the low pressure line 362 by the pressure control unit 341 and is supplied by flow through line 362 and check valve 461 to the converter inlet line 100. Check valve 461 prevents flow from converter feed line 100 to relief valve 363.

The lockup shift valve 445 will upshift in all forward and reverse ratios.

*Lockup cutoff valve unit*

The lockup cutoff valve unit 465 (FIG. 6) which disengages the lockup clutch 16 during each ratio change interval includes a valve 466 having lands a, b and c located in a bore 467 of uniform diameter. With the valve in the normally open position, as illustrated, the controlled lockup feed line 395 and the lockup clutch line 90 are connected by the space between the lands a and b. The exhaust port 468 for the lockup clutch line 90 is blocked by the land 466a. A spring 471 positioned in one end of bore 467 urges the valve 466 to this opened position. The main line oil is connected by line 340 to the bore 467 beneath the valve to act on the free end of land c spaced from the end of the bore by stud 478. The oil flows through orifice 424 to port 476 and ratio change line 425 when cutoff valve 466 is in the normally open position and directly through bypass 476, when valve 466 is opened, to limit the pressure drop across orifice 424 to supply the ratio change line 425 which is connected to supply the manual valve unit 427 and splitter shift valve 490 (FIG. 4) and to control the lockup cutoff valve 466. Line 425 is connected to bore 467 of valve 466 through an orifice 481.

The lockup cutoff valve unit 465 in its normal position is open to permit flow from the lockup valve unit 445 and controlled lockup feed line 395 to the lockup clutch line 90 and clutch 16 due to the action of spring 471 and the balanced opposing pressures in main line 340 and ratio change line 425 on the end faces of valve 466. Whenever the oil flows through ratio change line 425 to effect a change in ratio by filling one of the ratio motors, oil flows from the main line 340 through the orifice 424 creating a pressure difference between the oil in the main line 340 acting on the end face of land c and the oil in ratio change line 425 which acts on the opposite end face of land 466a. The higher pressure in line 340 raises valve 466 against spring 471 to stop 472 and connects lockup clutch line 90 to exhaust 468 and blocks controlled feed line 395. An excessive difference in pressure between main line 340 and ratio change line 425 will raise valve 466 against spring 471 further to connect these lines momentarily via the bypass 476 to reduce the pressure differential. Thus the normal main line pressure applied to the ratio clutch motors is reduced during each shift interval until the ratio motor is substantially filled and rapid flow stops. The point of engagement of the ratio clutch motor at which the pressure is increased and the lockup clutch engaged, is controlled by the force of spring 471. As the flow slows down, the pressure differential is reduced and at a certain low pressure differential spring 471 closes the valve 466. The flow of oil between line 425 to the spring chamber is restricted by orifice 481 to damp valve movement. When the lockup valve unit 445 opens, the lockup cutoff valve unit 465 will be in the normally open position illustrated to engage the lockup clutch 16 but will close during each ratio change interval to disengage the lockup clutch 70.

The lockup cutoff valve 466 in the normal position connects limited feed line 511 to exhaust 578 and in the cutoff position connects lockup supply line 395 to the limited feed line 511 to supply make-up fluid via intermediate high shift valve 570 and line 608 to exhaust valve 670.

*Splitter valve unit*

The splitter valve unit 490 (FIG. 4) automatically shifts to control the ratio of splitter gear unit 27 by actuating the splitter high clutch 48 to provide direct drive or by actuating the splitter low ratio engaging device 36 to provide underdrive. The governor forces acting on the valve unit 490 are changed to shift the splitter unit at three different vehicle speeds depending on the ratio engaged in the three-speed unit 46, the first when in low ratio, the second when in intermediate ratio and the third when in high ratio in the three ratio unit 46 to provide six drive ratios.

The splitter shift valve 491, located in bore 492–494, has lands a, b, c and d with intermediate spaces of lesser diameter. Lands a and b having an equal larger diameter fit in upper large bore 492 while lands c and d having an equal smaller diameter fit the lower small diameter bore 494. With the splitter valve 491 in the low position illustrated in FIG. 4, the ratio change line 425, which is regulated by regulator unit 341 and controlled during each shift by lockup cutoff valve unit 465, is connected to the valve bore 492 between the lands a and b. The line 425 is thus connected between the lands a and b to the splitter underdrive line 150. The exhaust 493 is blocked. The throttle pressure in line 408 enters the bore 492 via a port immediately adjacent the free end face of land a of valve 491 in the downshift position and acts on the valve 491 to hold it in this position. The downshift pressure in line 418 enters the bore 492 adjacent the end wall 496 and acts at all times upon the free end face of land a of valve 491 to move it to low position. The splitter control plug 497 having lands a and b is located in bores 498 and 499 respectively coaxially located with respect to bore 492. Land a of plug 497 closes the bore 499 at all times and at times acts on land a of valve 491. A spring 502 seated on piston 501 in stepped bore 500 biases plug 497, to engage the valve 491 to urge it to low position. The controlled lockup line 395 enters the bore 498 beneath land a of plug 497 to lift the plug 497 and eliminate the effect of spring 502 and the objectionable spring rate effect on the splitter shift valve 491 when the lockup valve 445 shifts to engage the lockup clutch. The shoulder 503 limits upward movement of the plug 497 and splitter valve 491. Thus the spring 502, unless made ineffective by lockup pressure from line 395, the throttle pressure from line 408 and the downshift pressure from line 418, tends to urge the splitter valve 491 down from high to low position.

In reverse, neutral and drive range positions of the manual valve unit 427, fluid is supplied via the drive signal line 435 to the closed end of bore 500 to move piston 501 down to the vented position. The movement is limited by the shoulders on the stepped piston 501 and bore 500 to a small degree that does not materially change the spring force on the plug 497. Then movement of piston 501 to the vent position thus does not materially affect the operation of the splitter shift valve unit 490 in reverse and neutral. Since fluid is not supplied by signal line 435 in low, intermediate and fifth gear hold range, the piston 501 remains in the upper or closed position shown but is effective only in fifth gear hold when fluid is supplied by the high ratio line 210 via port 504 in piston 501 to the closed bores 498–500 to act on plug 497 to hold the splitter shift valve unit 490 in the downshift position. In drive range fluid supplied via line 435 moves piston 501 down aligning port 504 and exhaust 505 to vent bores 498–500 to permit normal operation of valve unit 499.

With the valve 491 in the low position shown, the splitter high signal line 170′ located between large bore 492 and small bore 494 is connected between the lands $b$ and $c$ to exhaust port 506. The exhaust port 513 vents the space between the lands $c$ and $d$.

With the valve in the upper or high position, the main line 425 is connected between lands $b$ and $c$ to the splitter high signal line 170′ and the low ratio line 150 is connected to control exhaust line 493.

Since the splitter valve 491 shifts the splitter gear unit 27 between low and high ratio when the three-speed gear unit is in each of the three ratios, low, intermediate and high, combinations of the two governor pressures, front governor pressure (line 220), and rear governor pressure (line 320), provide three separate shift points. With valve 491 in low position illustrated in FIG. 4, the relay valve controlled line 517 may supply line pressure from line 434 to the bore 494 between land $d$ of valve 491 and the front governor splitter plug 518 which is located in bore 494 and engages land $d$. A low intermediate valve controlled front governor line 521 is connected to the valve bore 494 at the partition 516 having an aperture smaller than bore 494 and between front governor plug 518 and rear governor plug 522. A rear governor splitter plug 522 is positioned in the large bore 523 located coaxially with respect to the bore 494. Plug 522 has a stem 524 having a diameter smaller than plug 518 extending through the aperture in wall 516 to engage the lower face of front governor plug 518. The intermediate high controlled rear governor pressure in line 526 enters the bore 523 between the partition 516 and the plug 522 to urge the plug 522 down away from valve 491. The rear governor pressure in line 320 enters the end of the bore 523 via orifice 527 to act on the end face of plug 522 to urge the plug 522 and the valve 491 up to high drive position. The rear governor pressure in line 320 acting on the lower face of plug 522 when the three ratio unit is in high and intermediate is opposed in intermediate ratio by the intermediate high controlled rear governor pressure in line 526 acting on the smaller upper face of rear governor plug 522 to provide a reduced governor force in intermediate ratio. The low intermediate controlled front governor pressure in line 521 acts in low range between the front governor plug 518 and the rear governor plug stem 524 to urge the valve 491 to direct drive position and hold stem 524 and plug 522 down. The controlled pressure in line 517 acts, when an upshift or downshift between low and intermediate range is initiated, between land $d$ of valve 491 and front governor plug 518 to urge the valve 491 up toward direct drive position and hold plugs 518 and 522 down.

The rear governor line 320 between the orifice 527 and the splitter valve unit 490 has a branch 528 connected to the operating chamber of accumulator 529. The accumulator spring is sufficiently strong so the accumulator is not charged until after the third-fourth ratio shift of the splitter shift valve. Thus, the accumulator does not affect upshifts. After the fourth-fifth ratio upshift since rear governor pressure is high and since intermediate line 250 is exhausted, governor pressure charges the accumulator. The accumulator is discharged on a downshift to intermediate ratio since intermediate ratio line 250 is connected by branch 526 to the spring chamber of the accumulator. The discharge of the accumulator holds the splitter shift valve in the upshift position to insure a 5–4 or 6–4 ratio shift except under unusual conditions.

These governor forces tending to move the valve 491 from low to high position are opposed by spring 502, until disabled by rear pump pressure, and throttle and downshift pressures tending to return the valve to low position. When valve 491 is in high position, the main line pressure acting via ratio change line 425 on the unbalanced area of lands 491$b$ and $c$ provides the hysteresis action by tending to hold the valve in high position.

*Fifth ratio downshift inhibitor valve*

As pointed out above on a shift of the manual valve 427 from drive range to 5th gear hold, signal line 435 is exhausted at the manual valve and, if the transmission is in 6th ratio, high ratio line 210 supplies knockdown fluid via port 504 to the interior of piston 501 and bores 498–500 to act on plug 497 to hold the splitter shift valve in the downshift position at safe speeds. The downshift to 5th ratio inhibitor valve 520 (FIG. 4) is a pressure regulator or limit valve connected to branch 210′ of high ratio line 210 between port 504 and orifice 525. The orifice 525 is in the branch 210′ and must not be in line 210 between the intermediate high shift valve 570 and high motor 49. The pressure in branch line 210′ biases the piston of valve 520 to the exhaust position and the spring biases the piston to the closed position to regulate the pressure in line 210′ at a predetermined value lower than main line pressure so that this acting on plug 497 will only downshift the splitter shift valve 490 at safe speeds for a 6–5 downshift. At excessively high speeds dangerous to the transmission and vehicle this predetermined pressure will not overcome governor pressure and will not downshift the transmission.

*Low intermediate valve unit.*

The low intermediate shift valve unit 530 is hydraulically controlled by manual valve unit 427 to shift the three-ratio unit between low and intermediate ratio and to condition the splitter valve unit 490 to shift at the first or second shift point. This unit 530 consists of a splitter relay valve 531 located in a large bore 532 and low intermediate shift valve 533 located in a smaller diameter bore 534.

The relay valve 531 has lands $a$, $b$ and $c$ of equal diameter with intermediate spaced portions of reduced diameter providing flow spaces. In the intermediate and drive range position shown in FIG. 4, spring 536, located at the end of bore 532, holds the valve 531 on a strut 537 fixed between the bore 532 and bore 534. The low range line 434 is connected between the bores 532 and 534, and the oil acts on the end of land $c$ of valve 531 to raise it against the spring 536 to the low range position where land $a$ abuts stop pin 538.

With relay valve 531 in the intermediate and high range position shown, the low range branch 434 is blocked between lands 531$b$ and $c$, controlled line 517 is connected between lands 531$a$ and $b$ to exhaust 541 and spring chamber 543 is filled with oil. When the manual valve 427 is moved to low range, oil in line 434 at main line pressure moves relay valve 531 up against the lower throttle pressure supplied by line 542 to bore 532 above the valve. The first increment of movement, while line 542 is open, is fast and connects branch 434 to controlled line 517. After land $a$ closes line 542, the oil in the spring chamber, being retained by check valve 547, slows the valve 531 and only permits very slow movement due to slow leakage of oil past land 531$a$ to exhaust 542. During this slow movement in low range, the pressure in line 517 uplifts splitter valve unit 490. When land 531$a$ enters the spring chamber and permits communication with line 542, the valve 531 is substantially in low range position engaging stop 538, land $c$ blocks branch line 434 and controlled line 517 is connected to exhaust 541 permitting normal downshift of splitter valve unit 490.

When the manual valve unit 427 is shifted from low range, low range line 434 is exhausted, spring 536 returns valve 531 and draws oil from the sump through exhaust port 546, orifice 548, and check valve 547 to replenish the oil in spring chamber 543. Though the return movement is faster, since orifice 548 permits a greater flow than the clearance at land 531$a$ creating some pressure in exhausted line 434 to momentarily delay the delay of pressure in line 434 and controlled line 517 to momentarily inhibit a downshift of the splitter valve unit 490 during the shift interval. When valve 531 reaches the intermediate and high range position shown, line 434 is blocked and line 517 connected to exhaust 541 and line 542 fills the spring chamber.

The low intermediate shift valve 533 located in bore 534 has lands $a$, $b$, $c$ and $d$ of equal diameter and intermediate portions of reduced diameter to provide intermediate flow spaces. The land $d$ has a shoulder 551 which engages the valve body at the end of bore 534 and limits upward valve movement under the influence of main line pressure supplied by drive range line 432 via bore 552 through valve 533 to chamber 553 in the intermediate high position, shown in FIG. 4, preventing contact with strut 537 and valve 531. The spring 555 seated in bore 556 in the top of valve 533 engages strut 537 and valve 533 to urge the valve down in low range when pressure is supplied to the top by low range line 434 and to the bottom by drive range line 432 and in reverse when no pressure is supplied and drive and low range lines 432 and 434 are exhausted. A stop 554 in chamber 553 limits downward movement of valve 533 in the low position.

When the low intermediate shift valve 533 is in the intermediate high position shown, the low exhaust port 557 located between the lands 533a and $b$ is connected through low pressure relief valve 558 to sump to maintain a low pressure in exhaust port 557 and the connected low ratio line 270. The low makeup line 560 having an orifice 562 connects the controlled main line 425 to the exhaust port 557 to supply fluid lost by leakage to keep the exhaust port 557 and connected low ratio line 270 and the low ratio motor filled at a pressure insufficient for engagement. The drive range supply line 432 supplies controlled and regulated main line pressure to the bore 534 between the lands $b$ and $c$. The intermediate high supply line 559 is connected to the bore 534 between the lands $b$ and $c$. An exhaust port 561 is located between the lands $c$ and $d$. The controlled front governor line 521 is connected to bore 534 between lands $c$ and $d$. The front governor line 220 is connected to bore 534 opposite land $d$.

With the low intermediate shift valve 533 in the intermediate and high range position illustrated in FIG. 4, the drive range line 432 is connected between lands $b$ and $c$ to the intermediate high shift valve supply line 559 and via bore 552 to chamber 553. The low makeup line 560 connects the controlled main line 425 through orifice 562 to port 557 to replenish leakage. The low ratio line 270 is connected between lands $a$ and $b$ to the low pressure exhaust port 557 and low pressure relief valve 558 which maintains low pressure oil in low clutch line 270 to keep the low motor filled. The controlled front governor line 521 is connected between lands $c$ and $d$ to orifice exhaust 561.

When pressure in the low range line 434 acts between land $c$ on valve 531 and land $a$ on valve 533, to separate the valves, the relay valve 531 moves up as explained above and the valve 533 is moved down to the low range position by spring 555 since the low range pressure on top balances the drive range pressure on the bottom. In low range position, the drive range line 432 is connected between the lands $a$ and $b$ to the low ratio line 270 and low exhaust 557 is blocked by land $a$. The intermediate high supply line 559 is connected by the space between the lands $b$ and $c$ to exhaust 561. The front governor line 220 is connected between the lands $c$ and $d$ to the controlled front governor line 521 to provide front governor pressure on splitter plug 518 for a first to second ratio shift in low range when the three ratio unit 46 is in low.

In reverse, since pressure is not supplied to low range line 434 and drive range line 432, spring 555 moves valve 533 down to the low or reverse position. The low clutch line is exhausted to drive range line 432 which is exhausted at manual valve 427. The intermediate high supply line 559 is connected to exhaust 561. Front governor line 220 is connected to governor relay line 521 to actuate splitter shift valve 490 in reverse to provide two ratios.

*Intermediate high shift valve unit*

The intermediate high shift valve unit 570 (FIG. 3) automatically controls the intermediate high shift and one of the governor pressures acting on the splitter valve 490. The intermediate high shift valve 572 located in bore 571 has large diameter lands $a$ and $b$ located in a large bore portion 573 and small diameter lands $c$, $d$ and $e$ located in a small bore portion 574 and intermediate portions of smaller diameter between the lands. At the upper end of the bore 571, the wall 581 has a smaller diameter bore for the stem 582 of the intermediate high blocker plug 583 which has stepped lands $a$ and $b$ with the small land $a$ adjacent the stem 582 fitting in the intermediate size coaxial bore 586 and a second land $b$ at the end located in the large coaxial bore 587. Spring 591 engages the end wall of bore 587 and the upper face of land $b$ of plug 583 to urge the blocker plug 583 and shift valve 572 toward the intermediate position. A stud 592 fixed on the end wall of bore 587 limits upward movement, in the high position of valve unit 570. The intermediate range line 433 energized by manual valve unit 427 is connected to bore 587 near the end wall. At the shoulder between the bores 587 and 586, there is an exhaust port 594 to drain leakage oil. The rear governor line 320 is connected by port 593 to the bore 586 adjacent the wall 581 so that rear governor oil acts on the face of land $a$ adjacent the stem 582 to move plug 583 up against spring 591. The downshift pressure supplied by the throttle valve unit 401 is connected by downshift line 418 to bore 573 adjacent wall 581 and acts to raise the stem 582 and plug 583 and to act on the end face of the land $a$ of valve 572 to move the valve down toward intermediate position. The throttle pressure in line 408 enters bore 573 just above the land $a$ of valve 572 and tends to move the valve 572 down toward intermediate position and to move the plug 583 away from the valve 572. On upshift of the valve 572 to the high position, the land $a$ will close the port of throttle line 408.

With valve 572 in the intermediate position illustrated in FIG. 3 the intermediate ratio clutch is engaged, and the controlled intermediate exhaust line 601 is blocked by land $a$. The intermediate clutch line 250 is connected to the bore 573 between the lands $a$ and $b$ adjacent land $a$ of the valve 572. The intermediate high supply line 559 is connected to the bore 573 between the lands $a$ and $b$ adjacent land $b$. The high clutch line 210 is connected to the bore 573 between the lands $b$ and $c$ adjacent land $b$. Exhaust port 602 is connected to the bore 571 between the lands $b$ and $c$ adjacent land $c$. The rear governor line 320 is connected to a port 603 which is blocked by the land $c$. The controlled rear governor line 526 is connected to the bore 574 between lands $c$ and $d$ adjacent the land $c$. An exhaust port 607 is connected to the bore 574 between lands $c$ and $d$ adjacent land $d$. The limited feed line 511 is blocked by the land $d$. The intermediate exhaust feed line 608 is connected to the bore 574 between lands $d$ and $e$ adjacent land $d$. An exhaust port 611 is located between lands $d$ and $e$ adjacent land $e$. An exhaust port 612 is located adjacent the end face of the land $e$ of valve 572.

At the end of shift valve 572, bore 571 has a large portion 614 for the intermediate high plug 616 which engages land $e$ of valve 572 and stem 621. A port 617 in bore 614 adjacent the end wall 618 is connected to the rear governor line 320 so that the rear governor pressure acts on the lower face of plug 616 to urge the valve 572 up to high position. A transfer stem 621 extends through an aperture in wall 618 to a larger bore 622 located coaxially with respect to the main bore 571. The intermediate high accelerator plug 624 is located in bore 622 and acts through the stem 621 and the governor plug 616 on valve 572 to raise it toward high position. The controlled intermediate exhaust in line 601 is connected by port 626 to the lower end of bore 622 to act on the free end face of plug 624 to tend to move the valve assembly toward high position. Bore 622 between plug 624 and wall 618 is drained by exhaust 625.

The intermediate high shift valve 572 is urged to the intermediate position illustrated in FIG. 3 by the spring 591 acting through the intermediate high blocker plug 583 unless rear governor pressure in line 320 lifts the plug to disable the spring, by the pressure in intermediate range line 433 on plug 583 which is effective in intermediate and low ranges regardless of rear governor pressure, and by downshift pressure in line 418 and throttle pressure in line 408 acting on end face of land 572a. If one or more of these downshift forces overcome the upshift forces, valve 572 is in the intermediate position and the intermediate high supply line 559 is connected between lands a and b to intermediate clutch line 250. The high clutch line 210 is connected between lands b and c to exhaust 602. Rear governor line 320 is blocked by land c and controlled rear governor line 526 is connected between lands c and d to exhaust 607. The limited feed line 511 is blocked by land d and the intermediate exhaust feed line 608 is vented between lands d and e to exhaust 611.

In high range when intermediate range line 433 is exhausted, the valve 572 is conditioned by governor line 320 supplying oil under pressure to port 593 to raise blocker plug 583 and spring 591 out of engagement with valve 572 to provide a rateless valve. The rear governor pressure at port 617 then acts on the outer end of governor plug 616 against throttle pressure acting an land a to upshift valve 572. When valve 572 is upshifted to high position, the intermediate clutch line 250 is connected between lands a and b to the controlled intermediate exhaust line 601 which is also connected below the accelerator plug 624 to urge valve 572 to high position during the controlled intermediate exhaust period to provide hysteresis before the high clutch pressure has built up sufficiently to provide hysteresis on the unbalanced area of the shift valve. The intermediate high supply line 559 is connected between unbalanced lands b and c providing hysteresis to high clutch line 210 to engage the high clutch. Rear governor line 320 is connected via port 603 between lands c and d to the controlled rear governor line 526. The limited feed line 511 is connected between lands d and e to the intermediate exhaust feed line 608 and exhaust 607 and 611 are blocked by lands d and e.

*Fourth ratio downshift inhibitor valve*

On movement of the manual valve 427 from either drive range D or 5th gear hold 5 to intermediate position INT, the manual valve supplies pressure by intermediate range line 433 to act on plug 583 and downshift the intermediate high shift valve 570 to intermediate position. Line 433 is connected by branch 433' to fourth ratio inhibitor valve 627 (FIG. 3) which is a regulator valve regulating the pressure downstream of orifice 628 in line 433 and in bore 591 above plug 583 and line 433' at a predetermined pressure normally lower than line pressure to prevent forced downshifts at excessive speeds. Inhibitor valve 627 has a piston biased by pressure in line 433' to exhaust fluid from line 433' and reduce pressure in line 433'. The piston is spring biased to the closed position to maintain this predetermined pressure in line 433'. The valve 427 is best located close to bore 591 so abnormal pressure increases on plug 583 are prevented.

*Downshift timing valve*

Referring to the top of FIG. 4, the downshift timing valve unit 630, which controls the engagement of the intermediate clutch, has a valve member 631 with lands a and b of equal diameter connected by an intermediate portion of reduced diameter to provide a flow space and an end land c of smaller diameter located in a stepped bore 632. Spring 635 located in the vented end of bore 632 normally holds valve 631 in the closed position shown. Throttle oil in line 408 is connected to the bore 632 to act on the end face of land b and low clutch oil in line 270 is connected through an orifice to bore 632 to act on the end face of land c to open the valve 631. The valve 631 normally closed by spring 635 and opened only by both low clutch pressure and throttle pressure between one-half and wide open throttle. The portion of the intermediate clutch line 250 from the intermediate shift valve unit 570 is connected to the port 633 and the other portion of the intermediate clutch line 250 leading to the clutch motor 62 is connected to port 634. With the valve 631 in the open position, ports 633 and 634 are connected between lands a and b to freely connect the two portions of line 250. With the valve member 631 in the closed position shown, the land c engages the end of the bore to limit movement, and land a will block port 633 to cause the oil to flow through the orifice 636 connecting the two portions of line 250 to provide a slow feed for the intermediate clutch motor.

The valve 631 will be in open position when the oil in the low clutch line 270 applies low ratio clutch and the throttle is open, preferably one-half or more, there will be free flow through the valve 631 and line 250 permitting a quick application of the intermediate clutch on a high throttle shift from low. When either the low clutch line is exhausted or throttle pressure is low, preferably below half throttle, the valve is closed to block port 633, the oil flows through the restricting orifice 636 in line 250 to effect a slow application of the intermediate clutch. Thus on a low throttle upshift from low to intermediate, and on all downshifts from high to intermediate, the intermediate clutch is slowly applied through restricting orifice 636.

*Trimmer valve unit 640*

The trimmer valve unit 640 regulates the pressure in the ratio change line 425 from an initial low value to a final value equal to main line pressure at gradually increasing values modulated by throttle pressure during the engagement of all of the ratio engaging devices under all torques and may thereafter rapidly increase the pressure to main line pressure. This unit does not regulate the pressure supplied to the lockup clutch by line 90. The trimmer unit has a trimmer valve 641 and a trimmer plug 644 located in a bore 642. A spring assembly 643, consisting of two spring elements 643a and 643b with an intervening cup 643c permits in effect a longer spring with a more constant rate in the limited space between the regulator valve assembly 645 fixed at one end of the bore 642 and the plug 644 biases the plug and trimmer valve to the other end. The cup 643c limits movement of the plug toward the one end of the bore and excessive compression of the springs 643a and 643b. The valve member 641 has a central cavity 646 in which a spring 647 is located to provide a small separating force between the plug 644 and valve 641.

The regulator valve assembly 645 is fixed in bore 642 by pin 725 fitting a groove in valve body 726. The valve body 726 has a bore 727 receiving the piston 728. The bore 727 is closed at the outer end by the piston and has a wall 729 at the other end having a port 731. A spring 732 between the wall 729 and piston 728 biases the piston to the outer end into engagement with the end wall of bore 642. A spring 733 biases ball 734 to close port 731. The lockup clutch line 90 is connected by port 735 to the bore 727 between the piston 728 and wall 729. The throttle line 408 is connected to the end of bore 642 to act on piston 728. The lockup supply line 395 is connected by orifice 736 to the trimmer valve bore 642 between the regulator valve assembly 645 and the trimmer plug 644 to provide a biasing pressure in the spring chamber to assist the springs, which pressure is regulated by ball valve 734 at a pressure variable in accordance with throttle pressure when line 90 is connected to exhaust. When lines 90 and 395 are supplied, main line pressure in the spring chamber disables the trimmer valve 640.

With the valve in the normal position shown in FIG. 7 when the pressure in the ratio change line 425 is reduced due to the filling of a ratio change motor, the flow through the orifice 424 at the lockup clutch cutoff valve 465, FIG. 6, actuates the lockup cutoff valve to cut off the supply of pressure from the lockup shift valve 445 via line 395 to the lockup clutch line 90.

When line 90 is exhausted to disengage the lockup clutch 16, the regulator valve 734 of valve assembly 645 will function to reduce main line pressure in the bore at spring 643 to a low throttle modulated biasing pressure to condition the trimmer unit for operation. The reduced pressure in line 425 is connected to the other end of the bore 642 and acts to move the valve 641 and plug 644 as a unit against the biasing force of spring 643 and the biasing pressure just enough to permit the escape of fluid via exhaust 648 to regulate the pressure at an initial low value. The initial low pressure value increases with the throttle modulated biasing pressure and thus increases with increasing torque demand. At the same time the fluid from line 425 passes through the orifice 649 into the substantially filled chamber 646 between the valve 641 and plug 644 and increases the pressure in the chamber to a value almost equal to the pressure in line 425 to permit the spring 647 to begin to separate the valve and plug and increase the effective biasing force of spring 643. The biasing force of the spring 643 is increased since the separation of the valve and plug increases the length of the unit so that the spring operates progressively in a more compressed condition providing an increasing biasing force. The size of the orifice 649 will determine the rate of separation of the valve and plug and thus the rate of increase of the pressure in the ratio engaging devices supplied by the line 425. As the pressure in line 425 continues to rise due to the separation of the valve 641 and plug 644, the plug will engage the stop 645 at substantially the maximum pressure regulated by valve unit 640. Then the pressure in chamber 646 plus the force of spring 647 will move the valve 641 to close the exhaust. The spring 647 provides a small force so that the valve 641 closes when the plug abuts the stop and the pressure in the chamber 646 reaches a value slightly below the lowest regulated pressure in line 425. This value is selected at a value lower than the lowest main line pressure but sufficient to fully engage the ratio engaging devices at any torque encountered during engagement on the gradual portion of the pressure rise curve. Then the pressure in line 425 quickly rises to main line pressure to provide the safety factory to maintain engagement at any torque.

It will be appreciated that as long as the pressure in line 425 is being regulated and thus exhausted at exhaust 648 there will be a pressure drop from the orifice 424 holding the lockup cutoff valve unit 465 in closed position. As soon as valve 641 closes, the ratio engaging device having been filled and engaged during the gradual pressure rise, the pressure will equalize in lines 340 and 425 permitting the valve unit 465 to open to re-engage the lockup clutch.

When the valve 641 closes, the ratio engaging motor having been filled, flow in line 425 ceases and thus the lockup cutoff valve 465 opens to supply fluid from line 395 to line 90 to engage the lockup clutch. When this occurs, the line 90, also being connected by port 735 to the bore 732, closes regulator valve 734 so that pressure supplied by line 395 to the valve bore 642 at spring 643 cannot escape and balances the pressure from line 425 at the right end of the bore and the spring 643 moves the plug 644 against the valve element 641 ejecting the fluid between the plug and the valve via orifice 649.

The splitter high signal line 170' through check valve 639 to bore 642 between the valve 641 and plug 644 to disable the trimmer valve unit 640 in splitter high. The check valve 639 prevents flow from chamber 646 during normal operation of the trimmer valve unit during engagement of other ratios. The slots 638 insure that line 170' is, when the valve 641 is in the closed position, open to chamber 646.

Relay valve

The splitter high relay valve unit 650 (FIG. 7) relays regulated pressure from line 425 to splitter high line 170 on the supply by splitter high signal line 170' and consists of a valve element 651 having lands a, b and c of equal diameter located in a bore portion 652.

The spring 654 is located in one end of bore 652 and the throttle line 408 is connected to this end of bore 652 so that both the spring 654 and the throttle pressure always urge the valve down toward the exhaust position. With the valve in the exhaust position shown, the exhaust port 657 is closed by the land a. The splitter high line 170 is connected to exhaust 655. Ratio supply line 425 is blocked between lands b and c of valve 651. Splitter high signal line 170' is connected to act upon the unbalanced area of land c to oppose the force of the spring 654 and throttle pressure.

On an upshift of the splitter shift valve 490 connecting ratio supply line 425 to splitter high signal line 170' this pressure acts on land c to shift valve 651 to high position. Since a very small volume of fluid is needed, there is insufficient flow at the splitter shift valve to create a Bernouli effect and the unbalanced areas of the shift valve lands b and c instantly provide a uniform hysteresis effect that does not vary with flow. The shift of valve 651 against a light spring is damped by the throttle valve pressure. In high position, valve 650 disconnects splitter high line 170 from exhaust 655 and connects ratio supply line 425 to splitter high line 170 to engage splitter high. Since the lowest pressure value momentarily regulated by the trimmer valve 640 increases with throttle pressure, this pressure from ratio change line 425, splitter shift valve 490, and splitter high signal line 170' is always greater than throttle pressure.

Intermediate exhaust valve

The intermediate exhaust valve unit 670, which controls the exhaust from the intermediate clutch of the three ratio unit, consists of a valve 671 having lands a and b of equal diameter located in bore 673. Spring 674 and the throttle pressure connected by line 408 to bore 672 both act on the valve 671 to urge the valve down to the pressure increasing position.

With valve 671 in the neutral position as illustrated in FIG. 7, the exhaust port 677 is blocked by land a. The controlled intermediate exhaust pressure in line 601, which is regulated by regulator valve 601a (located near intermediate high valve 570) at a low pressure substantially lower than the pressure required to initially engage intermediate ratio and preferably just above the low pressure value required to hold intermediate ratio engaged, is connected between lands a and b of valve 671 and to orifice exhaust 675. Orifice exhaust 675 permits disengagement of intermediate ratio if valve 671 sticks. The intermediate exhaust feed line 603 which is supplied through the intermediate shift valve 570 from the limited feed line 511 is connected to bore 673 between lands a and b. The high clutch servo oil in line 210 connected to the end of bore 673 acts upon the end face of land b to raise the valve toward the open or pressure decreasing position against the spring 674 and throttle pressure acting down to increase the pressure.

The intermediate exhaust valve unit 670 controls the overlap in the intermediate to high upshift by maintaining the exhaust from the intermediate clutch line 250 and line 601 at a high pressure until high clutch pressure overcomes the throttle modulated biasing force. Increasing throttle pressure in line 408 will increase overlap requiring a higher high clutch pressure to exhaust the intermediate clutch up to a predetermined throttle pressure limited by regulator valve 682 and thereafter provide constant overlap. Orifice 682a limits flow through regulator valve 682. Since the pressure in line 601 holding intermediate ratio engaged is just sufficient for engagement when the high clutch pressure is sufficient to initially engage the high clutch and shifts the exhaust valve 671 to dump intermediate pressure in line 601, the intermediate clutch will be substantially instantly disengaged.

*Hydrodynamic brake and converter supply control valve unit*

The brake control valve unit 690 which controls the action of the hydrodynamic brake, illustrated in FIG. 7, consists of a valve 691 having lands a, b, c and d of equal diameter separated by portions of smaller diameter to provide flow spaces in bore 692. The spring 693, seated in the end of the bore vented by exhaust 696, engages the end face of land a which has a stud 694 which positions the spring and provides a stop to limit movement of the valve 691. At the other end of bore 692 the wall 698 is apertured to slidably receive the operating stem 699.

With the valve 691 in the brake-off position shown, the brake branch of the secondary line 356 which supplies oil to the brake from the pressure control unit 341 when the brake is on, is connected between lands a and b and blocked by check valve 695 in branch 697 of free cooler outlet line 714 which is connected to the same port between lands a and b as line 356. The branch 700 of the free cooler outlet line 714 and the restricted cooler outlet line 713 are connected to opposite ports and both are blocked by land a. The brake inlet line 180 is connected to the space between the lands b and c and the exhaust port 701 located between the lands b and c. The cooler inlet line 703 is connected to the bore 692 at a point blocked by the land c. Brake outlet line 181 is connected to the space between the lands c and d and vent 704 is connected between the lands c and d.

When the brake is applied, the valve 691 is moved into the valve bore 692 compressing spring 693 to the brake on position. This movement uncovers the secondary line 356 and free cooler outlet branch 697 gradually due to the tapered shoulder 706 of land b and provides a gradually increasing flow from these lines to the brake inlet line 180. If the cooler outlet flow and pressure via line 714 is insufficient to add to the flow from line 356, the check valve 695 will close preventing back flow. At the same time, the brake outlet line 181 is connected to cooler feed line 703 and exhaust ports 701 and 704 are closed. The degree of movement of valve 691 regulates the volume of oil supplied in line 356 to the brake and thus controls the braking effort of the brake. Increasing flow of oil increases the braking effort. Increased torque absorption of the brake increases the centrifugal pumping effect of the brake and brake outlet pressure which provides auto-circulation of brake fluid during braking.

The converter outlet line 101 (FIG. 1) is connected through one-way check valve 712 and cooler inlet line 703 to cooler 711. Check valve 712 prevents brake outlet oil flowing to the converter. The cooler outlet is connected to the free cooler outlet line 714 and the restricted cooler outlet line 713 having restriction 710 between the cooler and the lubrication supply branch 709. The restricted cooler outlet branch 709 is connected to the lubricating lines 716 and to front pitot governor feed 715. The pressure in the lubrication line 716 is regulated by the pressure relief valve 718 and the excess oil is by-passed via line 719 to the sump.

In the brake off position of brake valve 690, brake inlet line 180 and outlet line 181 are connected to exhausts 701 and 704 to disengage the brake. Cooler feed line 703 is blocked by land c so converter outlet flow in line 101 must go through the cooler 711. The free cooler outlet line 714 is connected by branch 697, check valve 695, between lands a and b, line 356, regulator valve 341, lockup valve 445 and converter inlet to supply the converter with auto-circulated fluid. Land a of valve 691 blocks the restricted cooler outlet 713 and branch 700 of free cooler outlet 714.

*Hydraulic controls*

The manual control unit 427 is employed by the operator to select one of four automatic ranges, low, intermediate, fifth gear hold and drive ranges, reverse or neutral. In low range, where the three ratio unit 46 is in low, either first or second ratio is automatically provided, depending on whether the splitter gear unit 27 is automatically positioned in splitter low or high by the governor and throttle actuated splitter shaft valve unit 490. When the manual selector valve is positioned in the intermediate range, the three speed unit 46 is in intermediate and either third or fourth ratio is automatically provided by a second shift point of the splitter shift valve unit 490 which shifts again under the influence of a different governor control and throttle control to provide either splitter low or high drive. In the drive range position of the manual valve, the automatic control provides third and fourth ratios previously available in intermediate range and, in addition, fifth and sixth ratios which are obtained by an automatic shift of the three ratio unit 46 from intermediate to high and a simultaneous downshift of the splitter valve and a third shift of the splitter shift valve from splitter low to high at a higher speed under the influence of another governor and the throttle pressure. Fifth gear hold range is the same as drive range except that the splitter shift valve is held in low when the rear unit is in high to prevent an upshift to sixth ratio, so only third, fourth and fifth ratios are provided. Reverse range provides reverse in the three speed unit and either splitter high or splitter low for two reverse ratios R1 and R2. Forced downshifting of the transmission by manual range shifting is inhibited to prevent excessive speeds, i.e., 20% over governed engine speed. A manual downshift to fifth gear hold range and thus to 5th ratio is inhibited by 5th ratio inhibitor valve 520, to intermediate range and thus 4th ratio by 4th ratio inhibitor valve 627 and to low range and thus 2nd ratio by 2nd ratio inhibitor valve 801. When the downshift is inhibited the transmission is maintained in a higher gear ratio.

| Ratio | Gear Ratio Conv. | Lockup | Neutral | Lo Rge. | Int. Rge. | 5th Rge. | Drive Rge. | Splitter Gear | | 3 Speed Unit | | | |
|---|---|---|---|---|---|---|---|---|---|---|---|---|---|
| | | | | | | | | Under Drive | Direct Drive | Lo | I | H | R |
| N | | | X | | | | | X | | X | | | |
| 1 | 14 | 5 | | X | | | | X | | X | | | |
| 2 | | 4 | | X | | | | | X | X | | | |
| 3 | 8 | 3 | | | X | X | X | X | | | X | | |
| 4 | | 2 | | | X | X | X | | X | | X | | |
| 5 | | 1.5 | | | | X | X | X | | | | X | |
| 6 | | 1 | | | | | X | | X | | | X | |
| R1 | 17 | 6 | | | | | | X | | | | | X |
| R2 | | 4 | | | | | | | X | | | | X |

In the table above, "X" shows the ratios available in each range and the gear ratio of both the splitter and three ratio unit that is engaged (the others being disengaged) to provide the six transmission ratios. The approximate numerical value of each ratio in converter and lockup drive is also shown.

When the vehicle starts from a standing start, the drive is transmitted through the torque converter which provides additional torque multiplication until a certain speed, preferably the speed at which the converter acts as a fluid coupling, and is reached, while the transmission is in first ratio. At this speed the lockup valve unit 445 (FIG. 5) moves under the influence of vehicle speed and throttle position to engage the lockup clutch 16 to provide a direct drive bypassing the torque converter. The lockup clutch is also disengaged by the lockup cutoff valve unit 465 each time a change in the gear ratio is made in the six ratio unit so the fluid drive of the converter smooths the gear ratio change.

*Neutral*

When the vehicle is at rest and the engine is started with the manual valve unit 427 in neutral, the engine drives the converter impeller housing 2 which is connected to drive the front pump 106. Front pump 106 (FIG. 7) supplies oil under pressure via front pump line 327 to check valve 333 and main line 340. The ball check valve 336 prevents oil exhausting through rear pump line 329 and rear pump 321 which is now inactive. Main line (340) oil at a pressure regulated by regulator valve 341 is blocked at lockup valve unit 445 by land 446b and flows to throttle valve unit 401 (FIG. 6) to provide throttle pressure in line 408 if the throttle is advanced, and is connected at all times around the throttle valve 403 by the annular passage 404 to the lockup cutoff valve unit 465. Due to the initial filling of some ratio clutch motors, there is a pressure drop between main line 340 across the orifice 424 to the ratio change line 425, and the lockup cutoff valve 465 is momentarily raised supplying oil via bypass 476 until the flow ceases and the pressure is equalized in these lines. The line 425 conveys oil at main line pressure to the manual valve unit 427 which, in the neutral position illustrated, blocks the line 425 between lands $a$ and $b$ of valve 428 preventing engagement of any ratio in the three speed unit 46 and to the splitter valve unit 490 which, in the initial position shown in FIG. 4, connects line 425 between lands 491a and b to the splitter low line 150 to engage the splitter low device 35 to place the splitter unit in low. The transmission gearing remains in neutral since the three ratio unit is not engaged in any gear ratio.

When the selector valve 427 is in neutral, the low and reverse lines 270 and 310 (FIG. 4) are maintained full of oil so that a rapid shift can be made between these gears for "rocking" the vehicle. Oil is supplied to reverse line 310 by orificed reverse makeup line 439 and limited to a low pressure only sufficient to fill but not actuate the reverse motor by the reverse relief valve 438 in exhaust 436. The low ratio line 270 and low motor is similarly filled with oil via orifice 562 and low makeup line 560 (FIG. 4) which is limited to a pressure insufficient to engage the low clutch by the low relief valve 558 at exhaust 557. The intermediate ratio line 250 is connected to exhaust through intermediate high shift valve unit 570, line 559, low intermediate shift valve unit 530, line 432 and manual valve unit 427 to exhaust 437. High ratio line 210 is connected at intermediate high shift unit 570 (FIG. 3) to exhaust 692. The splitter high ratio line 170 is connected by relay valve 650 (FIG. 7) to the exhaust 655.

At this time the pressure in main line 340 is regulated solely by the main line pressure acting on the unbalanced area of lands $b$ and $c$ and the opposing action of spring 367, on valve 343 of pressure control unit 341 (FIG. 5) to provide a constant pressure.

When the pressure in main line 340 reaches the level controlled by the spring 367, valve 343 is raised until the land $b$ permits the flow of oil to the secondary line 356. When the manual valve unit 427 is in neutral or any drive position and the lockup valve 445 in disengaged position, the secondary line 356 is connected to quickly fill the converter. The check valve 461 prevents flow from converter inlet line 100 through the low pressure line 362. Relief valve 462 prevents excessive pressure in line 100 due to cooler restriction.

The oil will flow out of the converter through the converter outlet line 101, check valve 712, cooler 711 and restricted cooler outlet line 713, to the front pitot feed 715 and the lubricating system 716 and to free cooler outlet line 714 to brake valve 690. The pressure in the converter is regulated by the regulating valve unit 341 which normally regulates the same pressure in the secondary line 356 and the main line 340. When there is an excess of oil for these lines, the regulator valve 343 moves up toward the exhaust position and vents the front pump line 327 directly to exhaust port 361. At this time, since there is full regulated line pressure in converter inlet line 100, the oil in port 361 cannot flow through line 362 and will exhaust through the low pressure relief valve 363.

This converter supply system with the brake valve 690 in the brake off position provides a converter auto-circulation system. The left portion of line 356 delivers oil via lockup valve 445 and line 100 to the converter. The converter outlet passes through line 101, cooler 711, brake valve 690 in the brake off position, the right portion of line 356 and the left portion of line 356 in sequence forming a loop circuit for the converter auto-circulation system. The fluid is circulated by the pumping action of the converter which circulates fluid from inlet 100 at the low pressure zone or the pump inlet to the outlet 101 at the high pressure zone or the turbine outlet. In the brake on position of valve 690, right line 356 supplies fluid to the brake.

When the converter 4 is filled and the splitter low clutch 35 is engaged in neutral, the converter and splitter low drives the intermediate shaft 33 and the front governor 51 to provide a low front governor pressure in line 220. The front governor line 220 is connected to the lockup valve unit 445 where it is opposed, when starting the vehicle, by greater spring and throttle forces to prevent lockup in neutral. Though racing the engine could upshift valve unit 445 to engage the lockup clutch, it would be disengaged by the lockup cutoff valve unit 465 when a ratio in the three ratio unit 46 is engaged to start the vehicle and then load would reduce the engine speed to downshift the lockup shift valve unit 445. The front governor line 220 is also blocked by land $d$ of the low intermediate shift valve 533 and thus cannot act on splitter shift valve 491. The splitter shift valve 491 and the intermediate high shift valve 572 are held by their springs in the downshift position and the relay valve 531 is held by its spring in the upshift position. The low intermediate shift valve 533 is held in the downshift or low position by its spring. Thus the vehicle always starts moving with converter and low splitter gear drive.

*Low range*

When the vehicle is standing with the engine idling, and the manual valve unit 427 is moved to the low range position "Lo," the ratio change line 425 is connected between the lands $a$ and $b$ to the drive range line 432, the intermediate range line 433 and the low range line 434 and remains connected by splitter shift valve unit 490 (FIG. 4) to engage splitter low. Line 434 is connected to the low intermediate shift valve unit 530 between the splitter relay valve 531 and the low intermediate shift valve 533 to move these valves apart to the low range position. The splitter relay valve is moved against spring 536 to the low position. The low intermediate shift valve 533 with low range line 434 pressure on top and drive range line 432 pressure on the bottom on balanced areas is moved down to the low position by spring 555. The relay valve 531 connects main line pressure via line 434' to line 517 to the splitter valve but it is insufficient to cause an upshift. The intermediate range oil in line 433 is connected to spring chamber or large bore 587 of the intermediate high shift valve unit 570 (FIG. 3) and acts on intermediate high blocker plug 583 to hold the intermediate high shift valve 572 in the intermediate position. The drive range line 432 is connected by the space between the lands $a$ and $b$ of the low intermediate shift valve 533 when in the low range position to the low ratio line 270 and is blocked from the intermediate high supply line 559 to prevent engagement of the intermediate ratio line 250 and high ratio line 210. The movement of the manual valve 427 to low range places the transmission in first ratio by supplying oil to raise the pressure in low ratio line 270 and engaging device 72 to place the three ratio unit in low ratio. The splitter gear unit having been in splitter low when the engine was started with the selector valve unit in neutral remains in splitter low. The transmission is in first ratio but with the engine at idling speed there is sufficient slip in the torque converter so that no drive is transmitted. As the driver advances the throttle and increases the engine speed, torque is transmitted and multiplied in the converter and the vehicle starts to move. The maximum pressure in the converter chamber is controlled by valve 462 when the lockup clutch is disengaged and drive is transmitted through the converter. At the same time, the throttle linkage connected through lever 414 (FIG. 6) acts on the throttle valve unit 401 to provide increased throttle pressure in line 408 with increasing throttle pedal position.

When the converter reaches the coupling stage, front governor pressure in line 220, acting on lockup plug 455, moves the valve 446 (FIG. 5) up at about four miles per hour to lockup position against spring 452 and throttle pressure in downshift line 418 acting on land $a$. Throttle pressure from line 408 is present in downshift line 418 except in sixth ratio, since these lines are interconnected at the splitter shift valve unit 490 and the intermediate high shift valve unit 570 when these valve units are in the downshift position. When the valve 446 is moved to the lockup position, the lockup feed line 395 is disconnected from exhaust 457 and connected to main line 340 which acts on the unbalanced area of lands $b$ and $c$ to provide hysteresis so that the lockup clutch is disengaged at a lower speed. Lockup feed line 395 is connected (FIG. 6) by lockup cutoff valve 466 in the normal position shown to the lockup clutch line 90 to engage the lockup clutch 16. The lockup feed line 395 conveys oil to the pressure control unit 341 at the lower face of land $b$ of knockdown plug 349 to reduce the pressure in main line 340 and secondary line 356. The main line pressure is always increased with increasing throttle pressure in line 408 and brake pressure in line 181 as explained in the above description of the pressure control unit 341.

When the lockup valve unit 445 is in lockup position directing engagement of the lockup clutch, the secondary line 356 is blocked and cannot supply the converter inlet line 100. As the pressure in the converter decreases due to flow to the cooler, the low pressure exhaust from the pressure control unit 341 at port 361 will flow through the line 362 and check valve 461 to the converter inlet line 100 and provide a low pressure feed at the pressure regulated by the relief valve 363.

As the vehicle accelerates, the front pitot pressure 220, and the rear governor pressure 320, increases in proportion with the rear wheel speed.

Splitter shift valve unit 490 in low range, is held in low by spring 502 connecting the ratio change line 425 to the splitter low ratio line 150 until lockup and then conditioned for an automatic shift by lockup oil supplied by line 395 to plug 495 to disable the spring for rateless automatic shift control by throttle and governor pressures to connect the splitter low ratio line 150 to the splitter low exhaust line 493 and connect the ratio change line 425 to splitter high line 170' to actuate relay valve 650 to connect line 425 to the splitter high ratio line 170.

The throttle pressure in line 408 is connected to the end of the bore 492, which is closed by plug 497, and urges valve 491 toward the splitter low position. The governor pressure proportional to speed acts to move the splitter valve 491 up to splitter high position. The low intermediate valve 533 now in low range position, connects front governor line 220 to relay controlled front governor line 521 and disconnects it from exhaust 561. Front governor line 521 is connected to splitter valve unit 490 to act on the lower face of front governor plug 518. The lower pressure rear governor oil in line 320, though acting on the lower face of the rear governor plug 522 is ineffective, since it is not high enough to overcome front governor pressure acting down on the plug. The intermediate high controlled rear governor line 526 is connected to exhaust at the intermediate high valve unit 570. The relay valve 531 in the low range position is raised and blocks line 434 and connects controlled line 517 to exhaust 541. The splitter valve 491 is thus controlled by the throttle pressure which tends to move the valve toward splitter low position and the front governor pressure acting via relay controlled line 521 to move the valve up to the splitter high position at about 12 miles per hour depending on throttle position. The splitter shift valve 491 which in first ratio connects ratio change line 425 to splitter low ratio line 150 and splitter high ratio line 170 to exhaust 506, shifts up for second ratio to connect ratio change line 425 to splitter high supply line 170' to relay valve 650 to connect line 425 to splitter high line and splitter low ratio line 150 to exhaust line 493.

When any ratio motor is engaged, i.e., when the ratio change line 425 is connected to splitter high line 170, the flow to fill the splitter high motor 39, from line 340 across orifice 424 to line 425 reduces the pressure acting on land $a$ of lockup cutoff valve 466 to upshift the valve so that lockup clutch line 90 is connected to exhaust 468 to disengage the lockup clutch 16 and the lockup clutch feed line 395 is connected to feed line 511 and the trimmer valve 640 is conditioned for a regulation cycle.

If the vehicle speed is decreased to about 11 miles per hour so that the relay controlled front governor pressure line 521 with the assistance of the direct clutch pressure in line 170 acting on the unbalanced area of lands $491b$ and $c$ cannot hold the valve up against the throttle pressure in line 408 and downshift line 418, the splitter shift valve 491 will move down to the splitter low position. In low range the throttle pressure line 408 is connected by bore 573 of the intermediate high shift valve unit 570 to downshift line 418 so that throttle pressure always acts on splitter shift valve 491 even though land $a$ blocks throttle pressure line 408 in upshift position. In the splitter low position, the valve 491 connects the splitter high line 170 to exhaust 506 and the ratio change line 425 to the splitter low line 150, and the controlled exhaust line 493 is blocked by land $a$.

It is also possible to manually downshift from splitter high to splitter low in low range by moving the throttle pedal to full throttle position or slightly beyond to move the downshift valve 411 toward the throttle valve 403 so that the throttle pressure in line 408 is higher than normal full throttle pressure which may be equal to main line pressure. Then the throttle pressure line 408 is connected by valve 411 to the downshift line 418 which is connected (FIG. 6) to the upper end of bore 492 to act on land $a$ to downshift splitter valve 491 to the splitter low position shown. When the accelerator pedal is returned from the downshift position to the normal driving range position, the land 411a blocks the throttle line 408 and downshift line 418, but downshift line 418 is exhausted by orifice exhaust 421 to restore normal governor and throttle pressure operation of the shift valves.

When the splitter high valve unit 490 upshifts to high, the splitter high line 170 is also connected to the space below land c of the regulator valve 343 to reduce main line pressure in converter drive. If the transmission is in lockup, lockup feed line 395, acting on land b of plug 349, reduces the main line pressure and the splitter high clutch pressure in line 170 does not further reduce the main line pressure.

In low range, first or second ratio, the high clutch line 210 is connected by intermediate high shift valve 572 to exhaust 602 and the intermediate clutch line 250 is connected by intermediate high valve 572 to intermediate high supply line 559 which is connected by low intermediate valve 533 to controlled exhaust 561.

Intermediate range

When the vehicle has reached the proper speed in second ratio and third ratio is desired, the transmission is shifted from low range to intermediate range by manually moving the manual valve unit 427 from low to intermediate position. In this position, the selector valve blocks the flow of oil from the ratio change line 425 to the low range line 434 and exhausts line 434 but supplies the drive range line 432 and the intermediate range line 433. When the oil pressure between the relay valve 531 and the low intermediate valve 533 is exhausted, the springs 536 return the relay valve to the central position, and the drive range line 432 pressure in chamber 553 returns low intermediate shift valve 533 to the central position.

The sequence of operation during a low to intermediate range manual shift described below, is the same as a low to drive range shift except that the intermediate range line 433 is exhausted which also permits the intermediate high shift valve to upshift to fifth and sixth ratio. This shift may also be made by the 3-2 inhibitor valve 801 which exhausts line 434 at excessive speeds in second ratio.

The spring 536 returns relay valve 531 at a moderate speed since a substantial flow is permitted from the sump through exhaust 546, orifice 548 and check valve 547 to spring chamber 543. Though, as the relay valve 531 passes mid-position, line 434' is momentarily connected to line 517, this has no effect since the valve 491 is in the splitter high position.

When drive range line 432 pressure moves the low intermediate shift valve 533 to the intermediate position as illustrated in FIG. 4, the low line 270 is supplied by makeup line 560 and connected through low pressure relief valve 558 to exhaust 557 to keep the low motor full and the drive range line 432 is connected between the lands b and c to the intermediate high supply line 559. The front governor line 220 is blocked by the land d of valve 533 and thus disconnected from the controlled front governor line 521 which is connected to exhaust 561. The intermediate high supply line 559 conveys main line oil from drive range line 432 to the intermediate high valve unit 570 of valve 572 to the intermediate clutch line 250 and through the downshift timing valve 630 to engage the intermediate clutch. The downshift timing valve 630 will connect intermediate clutch line 250 without restriction on a high throttle upshift but will provide a restriction on low throttle upshift.

Since the intermediate range line 433, in intermediate range as in low range, is supplied with oil under pressure from controlled main line 425 by manual valve unit 427 and this line 433 enters spring chamber 587, the oil acts on the intermediate high blocker plug 583 to hold the intermediate high shift valve unit 570 in intermediate position regardless of vehicle speed. The pressure on the area of land b of blocker plug 583 is limited by inhibitor valve 627 so the governor forces acting on the intermediate high shift valve unit 570 will upshift the transmission to protect the engine against being run at excessive speeds.

When the low intermediate shift valve 533 moves up to intermediate position and cuts off the front governor line 220 at land d, from the relay controlled front governor line 521, the relay valve 531 in intermediate position cuts off line 434 from controlled line 517. Since the controlled line 517 and the controlled front governor line 521 are cut off and do not act on the splitter valve 491 and the intermediate high controlled rear governor line 526 is exhausted at port 607, the only governor force acting on the splitter valve 491 is the rear governor line 320 which flows through orifice 527 and acts on the end face of rear governor splitter plug 522. The orifice 527 and accumulator 529 delay the build-up of rear governor pressure from line 320 on plug 522 of the splitter shift valve unit 490 so that the throttle pressure acting on land 491a will downshift this valve against the hysteresis and rear governor pressure. The lockup pressure in line 395 continues to keep plug 497 and spring 502 free of valve 491, so the valve 491 is rateless. Thus at all vehicle speeds when the manual valve is moved from low to intermediate range to effect a low to intermediate shift in three ratio unit 46, the splitter shift valve will, at the same time, downshift from splitter high to low position illustrated in FIG. 4 to effect a splitter high to low shift of the two speed unit 27 and the transmission will be in third ratio. If this 2nd-3rd ratio manual shift is made below the 3rd-4th ratio upshift speed which may be 24 miles per hour, the transmission will remain in 3rd ratio until the normal 3rd-4th ratio upshift occurs, but if it is made above this speed the transmission will shift to 4th ratio as soon as orifice 527 passes enough rear governor oil through line 320 to fill accumulator 529 and upshift splitter valve 491.

The lockup clutch would be disengaged and trimmer valve 640 conditioned for operation during the manual 2nd-3rd ratio shift.

Under normal driving conditions, the vehicle will be started on substantially level ground under a moderate load in intermediate range. When the transmission is in neutral as described above in neutral range operation, the front pump 106 supplies oil to the regulator valve unit 341 which provides a regulated pressure in main line 340, secondary line 356 and ratio change line 425. With the vehicle at rest, the front governor pressure is low and the lockup valve unit 445 is in converter drive or lockup clutch disengaged position illustrated in FIG. 5, disconnecting lockup feed line 395 and connecting the line 356 to the converter inlet line 100. The splitter valve unit 490 is held in the underdrive position by spring 502 connecting the ratio change line 425 to the splitter low clutch line 150 to place the splitter gear unit 27 in low. As in shifting from neutral to low range, the shift from neutral to intermediate range does not affect the splitter gear unit.

In neutral, as described above, the selector valve unit 427 connects the range lines 432, 433 and 434 to exhaust 437 and since oil is not supplied to the low, intermediate, high or reverse motor, the three ratio unit 46 is in neutral. When the manual valve unit 427 is moved from neutral to the intermediate position, the drive range line 432 and the intermediate range line 433 are energized while the low range line 434 remains connected to exhaust 437. The intermediate range line 433 is connected, as in low range, to intermediate high shift valve unit 570 at the upper end to act on intermediate high blocker plug 583 to hold the intermediate high shift valve 572 in intermediate position. The drive range line 432 conveys fluid from the ratio change line 425 to the low intermediate valve unit 530 which in intermediate range is held in the position shown. Spring 536 holds relay valve 532 down and since low range line 434 is exhausted, drive range line 432 pressure in chamber 553 holds low intermediate valve 533 up. In intermediate range the low intermediate valve 533 connects the drive range line 432 to the intermediate high supply line 559 which is connected by intermediate high shift valve 572 to the intermediate line 250 and downshift timing valve 630 to engage the intermediate ratio. On this manual shift into intermediate range, 3rd ratio, with the vehicle standing, the downshift timing valve 630 is in the restricting position since the three ratio unit has not been in low ratio. The intermediate clutch line 250 acts on lockup knockdown plug 349 to reduce the pressure decreasing effect of lockup feed pressure in line 395. The high clutch line 210 is connected between the lands *b* and *c* of the intermediate high shift valve 572 to exhaust 602. The low line 270 is connected between the lands *a* and *b* of the low intermediate shift valve 530 to the controlled exhaust 557 and valve 558 which keeps the low motor full. The reverse line 310 is connected through selector valve 427 to controlled exhaust 436 and valve 438 which keeps the reverse motor full.

Since the splitter valve unit 490 normally engages the splitter gear in low, the engagement of the intermediate gear of the three speed unit by shifting the manual valve unit 427 to intermediate range, places the transmission in third ratio converter drive. When the engine is idling, no drive is transmitted, but when it is accelerated, the vehicle will move and the front governor line 220 provides a pressure proportionate to the rear wheel speed as modified by the intermediate gear ratio which acts on the lower face of the lockup plug 455 and tends to shift the lockup valve 446 against the opposing force of spring 452 and throttle pressure from line 418. When the vehicle has reached a speed at which torque multiplication is not required and the converter reaches the coupling stage, the lockup valve 446 will upshift as in low range operation. High throttle and forced disengagement of the lockup clutch is provided in the first to fifth ratios and only forced disengagement in sixth ratio below certain engine speeds.

As in low range, when the lockup valve 445 upshifts, the splitter shift valve 490 is conditioned for a rateless upshift. In intermediate range, throttle pressure from line 408 acts down on land 491a and the rear governor pressure in line 320 is connected to the end of large bore 523 to act upon the rear governor splitter plug to urge the valve to upshift position. The relay controlled line 517 is connected by relay valve 531 to exhaust 541. The front governor pressure in line 521 does not act on the front governor splitter plug 518 since line 521 is connected to exhaust port 561. Since intermediate high shift valve 572 is in intermediate position, rear governor line 320 is blocked by land *c* and controlled rear governor pressure in line 526 which in high ratio acts down on plug 524 of the splitter valve is connected to exhaust 607.

When the rear governor pressure overcomes the throttle pressure, at about 24 miles per hour, and upshifts splitter valve 491 to provide a 3rd to 4th ratio shift, the splitter high signal line 170' is disconnected from exhaust 506 and connected to ratio change line 425. The ratio change line 425 is disconnected from splitter low line 150 which is connected to exhaust line 493. Since the three ratio unit 46 is in intermediate ratio, the engagement of splitter high of the two ratio splitter unit 27 and the disengagement of splitter low places the transmission in 4th ratio.

When a low to intermediate range manual shift is made at speeds above the third-fourth upshift point of the splitter valve unit 490, the low to intermediate ratio shift of the three speed unit 46 will occur in the same way as described above for the second to third ratio shift, but the splitter valve unit 490 will not downshift providing a second to fourth ratio shift.

On these shifts, the flow through line 425 and orifice 424 causes the lockup cutoff valve unit 465 to disconnect the lockup feed line 395 from the lockup clutch line 90 and exhaust line 90' to disengage lockup clutch and condition the trimmer unit 640 to regulate the apply pressure.

The splitter valve unit 490 (FIG. 4) may be downshift from 4th ratio by an increase in the throttle pressure in line 408 and interconnected downshift 418 due to increasing throttle pedal position or a decrease in rear governor pressure in line 320. Due to the hysteresis effect on the unbalanced area of the splitter valve 491, after a full throttle upshift at 24 miles per hour, the downshift due to a reduction in speed will occur at about 21 miles per hour at full throttle and somewhat lower at closed throttle. The splitter valve may also be downshifted when the throttle valve unit 401 is moved to downshift position by downshift pressure in line 418 which acts on land 491a. This 4th to 3rd ratio shift will actuate the lockup cutoff valve unit 465 to disengage the lockup clutch.

When the manual value unit 427 is moved to the intermediate range and as in 3rd ratio with lockup shift valve 446 upshifted, the intermediate clutch line 250 is energized and oil acts downwardly on the knockdown plug 349 of the pressure control unit 341 to reduce the pressure decreasing effect of the lockup feed oil in line 395 acting on the knockdown plug 349 to reduce the main line pressure which provides main line 340 pressure slightly higher than in other ratios during lockup. When splitter high is engaged, as in 4th ratio, the splitter high clutch line 170 acts on land *c* of pressure regulator valve 342 to reduce the pressure in main line 340 to the same extent that lockup feed pressure in line 395 reduces the pressure. When the splitter gear is in high or the lockup valve 446 upshifted or both, the same reduction in regulated pressure in main line 340 is obtained except that in 3rd ratio, where the intermediate clutch line increases the pressure when reduced only by valve 446. When the converter is operating in 1st and 3rd ratios, there is a much higher main line pressure in line 340. These main line pressures are also increased with increasing throttle pressure in line 408 and brake pressure in line 181.

In the intermediate range, the vehicle is started in third ratio and upshifts due to the upshift of the splitter valve unit 490 (FIG. 4) at normal speeds to fourth ratio and cannot upshift to fifth ratio since the intermediate high valve unit 570 is held in the intermediate position by the regulated range oil in line 433'. Intermediate oil 433' produced by inhibitor valve 627.

This regulated pressure permits an upshift into 5th range before excessive engine speeds are reached.

The transmission can be manually shifted from intermediate to low range at normal speeds by moving manual valve 427 from INT to LO position to provide a forced downshift from fourth or third ratio to second or first ratio. As explained above in low range, the manual valve in LO, energizes the high range line 432 to supply oil to the low intermediate valve unit, the intermediate range line 433 to hold the intermediate high valve unit 570 in intermediate position and the low range line 434 to move the relay valve 531 to low position. The low intermediate valve 533 has balanced low and drive or high range pressure on opposite ends so spring 555 moves it to low position.

The low intermediate valve 533 in low position disconnects ratio change line 432 from intermediate high supply line 559 which is connected by intermediate high valve unit 570 to intermediate line 250 and connects it to low line 270 to engage the low ratio of the three-speed unit 46. This ratio will be quickly engaged since low relief valve 558 kept the lines and motor filled with oil. The intermediate motor is exhausted by line 250 which is connected through intermediate high valve to intermediate high feed line 559 which is connected by valve 533 to exhaust port 561. Since low clutch line 270 is exhausted when this 3rd-2nd shift is initiated, valve 630 is closed and intermediate exhaust is restricted by orifice 636. The movement of low intermediate valve 533 to low also connects front governor line 220 to controlled front governor line 521 to act on plug 518 of the splitter valve 490 to provide 1st to 2nd ratio shifts.

The low range oil in line 434 also acts on land c of relay valve 531 and moves the valve up at a slow rate timed by the exhaust of fluid from chamber 543 above the valve 531. This first movement of valve 531 connects lockup line 395 to controlled line 517 which acts on land d of splitter valve 491 for a limited time starting with the intermediate low shift to positively position the splitter valve in splitter high position. This insured a 4th to 2nd or 3rd to 2nd shift and prevents a 4th to 1st or a 3rd to 1st shift which would be rough except at very low speeds where there is no lockup pressure. The low range oil continues to urge valve 531 up and there is sufficient leakage to permit slow movement until the valve 531 engages stop 538 and land c blocks lockup line 395 and controlled line 517 is connected to exhaust 541. Then the splitter valve 491 functions as in low range operation to automatically control shifts between 1st and 2nd ratio as explained above. At low speeds after a 3rd to 2nd manual shift, a 2nd to 1st automatic shift would occur substantially instantaneously to provide a smooth 3rd to 2nd to 1st shift.

At excessive speeds, a forced manual downshift by operation of the manual valve from intermediate range to low range is prevented since the second ratio downshift inhibitor valve 801 is closed by governor pressure preventing the supply of pressure from manual valve 427 via line 434 to the low intermediate valve 533. Thus the transmission continues to operate in intermediate range until the speed is reduced to a normal value.

*Drive range*

When the transmission is placed in drive range by positioning the manual valve unit 427 in D position, the transmission starts in third ratio and automatically shifts between third, fourth, fifth and sixth ratios. The controls are the same as in intermediate range, except that the intermediate signal line 433 is exhausted, so the intermediate high valve unit 570 (FIG. 3) is free to upshift under the influence of rear governor and throttle pressure and the drive signal line 435 is supplied to move the fifth gear hold piston 501 on the splitter shift valve unit 490 to exhaust position to prevent operation of the fifth gear hold system. The rear governor pressure in line 320 is at low speeds insufficient to lift the blocker plug 583 and intermediate high valve 572 is held in intermediate by spring 591. The vehicle thus starts in 3rd ratio and will be automatically upshifted by splitter valve unit 490 to 4th ratio in intermediate range. Since intermediate high valve 572 is free, when the speed increases in fourth ratio to the proper value, about 33 miles per hour at full throttle, valve 572 will shift the three speed unit from intermediate to high and the splitter valve 491 will downshift the two speed unit from direct to underdrive for the 4th to 5th ratio shift.

When the transmission is operating in fourth ratio in the intermediate range and the manual valve unit 427 is in drive range, the intermediate range line 433 is disconnected from the ratio change line 425 and connected to exhaust 437 to remove the line pressure from the end of land b of the intermediate high blocker plug 583 and permit the intermediate high shift valve 572 to automatically shift from the intermediate position in which it was held during intermediate range drive to the high range position under the influence governor and throttle pressure. The operation of the splitter valve unit 490 and the low intermediate valve unit 530 are not changed by the movement of the manual valve from intermediate to drive range position, so the transmission is not manually shifted, but merely conditioned for automatic shifting between 3rd and 6th ratios and not held in the intermediate range limits of 3rd and 4th ratios. When a shift to high range is made from 3rd ratio, the splitter valve unit 490 will automatically upshift at the proper speed to provide 4th ratio as explained above in the intermediate range.

The 4th to 5th ratio shift is automatically controlled by intermediate high valve unit 570 under the control of throttle and rear governor pressure. The throttle pressure in line 408 is connected to the end of bore 573 of valve unit 570 below wall 581 and the stud 582 to act upon the face of land a of valve 572 to urge it in the downshift direction toward the intermediate position illustrated in FIG. 3. The rear governor pressure in line 320 is connected to the intermediate high valve unit 570 at the port 593 to act upwardly on blocker plug 583 against spring 591 to first move the blocker plug 583 up to free valve 572 to condition the valve for a rateless intermediate high shift and is connected at the port 617 to act upwardly on the lower face of the governor plug 616 to overcome the throttle pressure acting downwardly on valve 572 for an upshift. The intermediate high shift valve 572 in upshift position disconnects the intermediate high supply line 559 from the intermediate ratio line 250 and high clutch line 210 from exhaust 602 and connects intermediate high supply line 559 to the high clutch line 210 and the intermediate ratio line 250 to controlled intermediate exhaust line 601.

A hysteresis or spread between the upshift and downshift points is obtained partially due to the fact that the intermediate high supply line 559 is connected between unbalanced lands b and c to the high clutch line 210. The controlled intermediate exhaust line 601 is connected at port 626 to the end face of the accelerator plug 624 to act upwardly to provide an upshift force or additional hysteresis effect on the intermediate high valve 572 during the short interval that the intermediate exhaust valve unit 670 retains a pressure in the intermediate exhaust line 601. This connection of line 601 to plug 621 of shift valve 572 quickly provides an accelerating force to prevent a downshift until the high ratio clutch pressure in line 210 increases when the clutch is substantially engaged and thus prevents hunting of this shift valve.

The flow of oil to engage the high clutch closes the lockup cutoff valve unit 465 to disengage the lockup clutch 16 as in other ratio changes.

On the intermediate to high shift the exhaust from the intermediate clutch line 250 will be restricted by orifice 636 since the downshift timing valve unit 630 is closed due to the lack of pressure in low ratio line 270. Since the intermediate exhaust control valve 670 restricts the intermediate exhaust more than orifice 636, the downshift timing valve unit 630 does not affect the intermediate exhaust.

The lockup feed line 395 is connected by cutoff valve 465 in the cutoff position during a shift to deliver oil to the limited feed line 511 which is connected to the valve unit 570 where it is blocked in intermediate position by land d and connected in the high position to the intermediate exhaust feed line 608. The intermediate exhaust valve unit 670 provides overlap during the intermediate high shift. The controlled intermediate exhaust line 601 is connected to orifice exhaust 675 to insure exhaust if the valve 671 sticks and between the balanced lands a and b of the valve 671 (FIG. 7). The spring 674 and the throttle pressure 408 act on the end face of land 671a and tend to urge the valve down to close the exhaust 677 and open the intermediate exhaust feed line 608 which can supply oil to the intermediate exhaust controlled valve unit 670 to maintain main line pressure in the intermediate exhaust line 601 and intermediate ratio motor. As the high clutch motor 49 is filled, and the clutch engaged, the pressure in the high clutch line 210 will increase and act upon the lower face of the intermediate exhaust plug 681 to move the intermediate exhaust valve 671 against the spring and throttle pressure biasing force to the exhaust position and to block feed line 608 and open exhaust 677 to relieve the pressure in controlled intermediate exhaust line 601 and intermediate clutch cylinder.

The intermediate exhaust control valve unit 670 provides an overlap during the intermediate high shift. The intermediate exhaust is initially established at main line pressure. If there is leakage, the valve 671 will add oil from feed line 603 to maintain intermediate clutch pressure at main line pressure. The high clutch pressure connected by line 210 raises the valve 671 against the spring and throttle pressure biasing force when the high clutch is substantially engaged and blocks feed line 603 and connects line 601 to exhaust 677 to disengage the intermediate clutch. In this way, the release of the intermediate clutch is delayed until engagement of the high clutch to provide the proper overlap regardless of factors, such as leakage at the clutch motor and shift valve which vary within manufacturing tolerances.

When the intermediate high shift valve unit 570 upshifts from the intermediate to the high position, it also connects the rear governor line 320 which in the intermediate position has been blocked by the land c to the controlled rear governor line 526. The line 526 is connected to large bore 523 of the splitter valve unit 490 and acts upon the upper face of the rear governor splitter plug 522 to partially oppose the rear governor pressure from line 320 acting on the larger lower face of this plug 522. This reduces the effective area on which the rear governor pressure acts. This reduction in the governor pressure force acting on the splitter valve unit 490, when the intermediate high valve unit 570 shifts from intermediate to high position, is under normal conditions where the upshift occurs with the vehicle being accelerated under substantially constant throttle sufficient to cause the splitter valve 491 to downshift from the splitter high position to the splitter low position. As explained above, this downshift of splitter valve 491 connects the splitter high clutch line 170 to exhaust 506 and the ratio change line 425 to supply the splitter low clutch line 150 to downshift the splitter gear unit. The orifice 527, on this 4-5 shift delays the exhaust of rear governor pressure in line 320 to insure that the splitter valve does not downshift the splitter gear unit before the rear unit is upshifted from intermediate to high. The accumulator 529 does not affect this timing since it cannot be charged until the pressure in the intermediate clutch line is substantially reduced.

The shift from intermediate to high and the downshift of the splitter unit from direct drive to underdrive occurs substantially simultaneously and provides the shift from fourth to fifth ratios at about 33 miles per hour at full throttle. It will be appreciated that during the interval that the motors are being filled, that the lockup clutch 16 will be disconnected and the trimer valve 640 will control the pressure as explained above.

When the vehicle is on a downgrade or under light load, when an automatic intermediate to high shift is made under the control of the intermediate high valve unit 570 that due to a large decrease in throttle pressure or a large increase in rear governor pressure, the splitter valve unit 490 will not downshift, but would remain in splitter high, then a fourth ratio to sixth ratio shift would be made.

After a 4th to 5th shift, a further increase in the rear governor pressure in line 320, due to an increase in vehicle speed, will upshift the splitter valve unit 490 at about 46 miles per hour. The splitter high drive in the splitter unit 27 and high in the three-speed unit 46 provide 6th ratio. As pointed out above, when the intermediate high valve is in high, rear governor pressure in line 320 and line 526 acts on the plug 522 to provide a net upshift force on splitter valve 491. The relay controlled line 517 and controlled front governor line 521 are exhausted. The upshift of the splitter valve supplies oil to splitter high line 170 for splitter high drive and controls splitter low exhaust in line 150 similar to the previously described upshifts which occur in low and intermediate range. The flow of oil to the direct drive line 170 disengages the lockup clutch 16.

Under a very light load or a downgrade, where the operator after accelerating would close the throttle, the transmission may automatically shift from 3rd ratio to either 5th or 6th ratio depending on the vehicle operating conditions speed and throttle opening. The accumulator 529 will not affect these shifts.

When the transmission is in sixth ratio, normal throttle pressure does not act to downshift the shift valves, the high intermediae valve unit 570 or the splitter valve unit 490 or converter lockup valve unit 445 since the high intermediate valve unit 570 and splitter valve unit 490 are upshifted and block the connections between throttle line 408 and downshift line 418. However, when the vehicle speed is reduced, the rear governor pressure in line 320 is reduced to permit spring 591 to act through blocker plug 583 to downshift the intermediate high valve unit 570 first to disconnect the high clutch line 210 and to connect the intermediate line 250 to intermediate high supply line 559 to slowly engage the intermediate clutch through orifice 636. At this time the rear governor pressure has not reduced sufficiently to permit spring 502 to downshift the splitter valve unit 490 so there will be no 6th to 5th downshift. Since low line 270 is exhausted on a 6th–4th ratio shift, the downshift timing valve 631 is closed blocking the free bypass so flow to the intermediate clutch passes through orifice 636 to soften the clutch engagement on these downshifts. When the intermediate high valve unit 570 downshifts, the land c blocks rear governor line 320 and connects controlled rear governor line 526 to exhaust 607 to increase the net area on which rear governor oil in line 320 acts on plug 522 of the splitter valve 490. The downshift of the intermediate high valve unit 570 also connects throttle line 408 and downshift line 418 so that throttle oil is connected by downshift line 418 to act down on splitter valve 490. This increase in net area on which the rear governor pressure acts will provide a 6th to 4th ratio shift which with falling vehicle speed or a high throttle pressure is followed by a downshift of the splitter valve unit 490 to provide a 4th to 3rd ratio shift. If vehicle speed is falling very rapidly or throttle pressure is high, these shifts may occur substantially simultaneously for a 6th to 3rd shift.

In 5th ratio, throttle oil from line 408 is connected at the splitter valve unit 490 to downshift line 418 and thus acts on all shift valves. In this ratio, a downshift occurs when throttle pressure increases or rear governor pressure decreases. The intermediate high valve unit 570 first downshifts to disconnect high clutch line 210 and to connect intermediate line 250 to engage intermediate ratio of the three speed unit. This downshift also vents the controlled rear governor line 526 to increase the effective area of plug 522 on which rear governor oil acts in splitter valve unit 490. Also, when intermediate ratio is engaged, fluid from intermediate line 250 discharges accumulator 529 to momentarily supply an increased pressure to bore 523 to act upon plug 522 until the pressure equalizes across orifice 527. These factors normally upshift the splitter valve 491 to connect the ratio change line 425 to direct drive line 170 to engage splitter high to place the transmission in 4th ratio. This insures a 6 to 4 or a 5 to 4 shift under normal conditions. As in other splitter gear upshifts, the underdrive exhaust is controlled by low exhaust control valve 650. If the vehicle speed is falling fast and the governor pressure is insufficient to charge the accumulator, the governor pressure would generally be insufficient to upshift the splitter gear unit, a 5th to 3rd ratio shift will occur. In 4th ratio, throtttle line 408 and downshift line 418 are connected at the intermediate high shift valve unit 570, to provide with high throttle or low speed a downshift of splitter valve unit 490 for 3rd ratio.

Since the throttle line 408 is disconnected from the shift valves in 6th ratio, the normal downshift is a forced full throttle or detent downshift. This occurs at full throttle when the throttle valve unit 401 connects maximum throttle pressure, which is preferably less than line pressure but could be equal to line pressure, between lands 411a and b to downshift line 418. When line 418 is connected to lockup valve 445, the lockup clutch will be disengaged and the converter will provide torque multiplication. At low vehicle speeds, the intermediate high valve unit 570 and the splitter valve unit 490 will both downshift under the influence of downshift oil in line 418 to provide a 6th to 3rd ratio downshift. At moderate vehicle speeds, the rear governor oil will exert a force on plug 522 of the splitter valve unit 490 to prevent a downshift of the splitter valve so that when downshift oil in line 418 downshifts the intermediate high valve unit 570, the transmission shifts from 6th to 4th ratio. Since the downshift of the intermediate high valve unit 570 on the 6th to 4th shift increases, the net area on which rear governor pressure in line 320 acts on the splitter valve unit 490, the 6th to 4th shift is at moderate speeds followed by a 4th to 3rd shift. At high vehicle speeds, only the splitter valve unit 490 will downshift to provide a 6th to 5th downshift. At very high vehicle speeds the downshift pressure will be insufficient to provide a downshift. If the transmission is in 5th ratio, which only occurs at substantially full throttle, the oil in line 418 will downshift the intermediate high shift valve unit 570. Since the vehicle is in 5th ratio only at substantially full throttle and thus high speeds, the downshift of the intermediate high valve unit 570 will increase the area on which rear governor oil in line 320 acts on the splitter valve unit 490 and normally upshift the splitter valve 491 to provide a 5th to 4th ratio shift. However, with falling speed, a 5th to 3rd downshift could occur. At moderate speeds, a 4th to 3rd forced downshift may be obtained. On these 6–5, 6–4, 6–3, 5–4 and 5–3 forced downshifts, the downshift timing valve 630 is closed since low clutch line 270 is exhausted and intermediate clutch oil in line 250 passes through orifice 636 to slowly apply the intermediate clutch.

The transmission may be manually downshifted from drive range or 5th gear hold range to intermediate range at higher speeds but not at excessive speeds to provide a 6th to 4th or 5th to 4th or a 6th to 3rd ratio shift depending on vehicle speed. The movement of manual valve unit 427 from high range to intermediate range applies intermediate range oil in line 433 to blocker plug 583 to downshift the intermediate high valve unit 570. The downshift of valve unit 570 exhausts high clutch line 210 at exhaust 602 and supplies oil to intermediate line 250. Since low line 270 is exhausted, downshift timing valve 630 is closed by the spring 635 and the intermediate oil in line 250 passes through the orifice 636 to slowly engage the intermediate ratio. This shift of the intermediate high valve unit 570 also disconnects and vents controlled rear governor line 526 and discharges accumulator 529 to increase the governor force on the splitter valve 490 so that an automatic 6th to 4th shift would normally occur. However, at very low vehicle speeds a 6th to 3rd ratio shift can occur. Since the transmission only stays in 5th ratio at substantially full throttle and thus fairly high speeds on manual downshift, a 5th to 4th ratio shift usually occurs, though a 5th to 3rd shift is possible at low speeds. At excessive speed, this downshift from drive range or 5th gear hold range to intermediate range is inhibited by 4th ratio inhibitor valve 627. Valve 627 regulates the pressure in line 433 beyond orifice 628 and in bore 591 and branch line 433' at a value less than line pressure to prevent forced downshifting of intermediate high shift valve 570 at excessive speeds. The transmission will thus remain in 5th gear hold range unless the 5th gear hold inhibitor valve is also operative to prevent this and thus holds the transmission in 6th ratio drive range.

A manual downshift from drive range to low range is made by moving manual valve unit 427 from D to LO position to provide a 6th to 5th to 2nd or 1st ratio shift.

The controls function in the same way as in the manual downshift from intermediate range to low range to establish second ratio and the normal low range control between second and first ratios. The low intermediate valve 533 moves to supply low line 270 and disconnect supply line 559 for the intermediate and high lines 250 and 210 and moves relay valve 531 to hold splitter valve 491 in splitter high during the shift interval. If, when a drive range to low range shift is made, the transmission is in 3rd or 4th ratios and the intermediate ratio engaged, the intermediate exhaust is connected by lines 250 and 559 and valve 533 to exhaust port 561, the flow being retarded by reverse exhaust valve 438 but if the transmission is in 5th or 6th ratios and the high clutch engaged, the high clutch exhausts freely via line 210 and intermediate high valve unit 570 to exhaust 602 to reduce overlap to permit the engine to speed up.

*Fifth gear hold range*

The fifth gear hold range is employed to limit the ratios available under the control of the automatic shift valve to the third, fourth and fifth ratios in order to provide another intermediate performance range and an intermediate downhill braking range. Fifth gear hold range is obtained by moving the manual valve unit 427 to the fifth gear hold position "5" to connect the ratio supply line to the drive range line 432 and to connect a drive signal line 435 to the exhaust. The exhausting of the drive signal line 435 permits activation of the fifth gear hold control on the splitter shift valve unit 490, FIG. 4, by allowing the spring 502 to return the piston 501 to the end of the bore 500. Thus when the intermediate high shift valve unit 570 upshifts to supply line pressure via line 210 to engage the high clutch, the line 210 is also connected to the bore 500 and through a port 504 in the piston 501 to fill the cavity within the piston and bores 500 and 498 to hydraulically hold the splitter shift valve 491 in the downshift position shown. This prevents an upshift to sixth ratio. In all other respects, the operation in fifth gear hold range is the same as in drive range.

Movement of the manual control lever to drive range will supply fluid via drive signal line 435 to the bore 500 to move the piston 501 a small distance against the opposing shoulders on the stepped bore and piston to align the line port 504 and the exhaust 505 to exhaust the pressure in the bore 500–498 acting to hold the splitter shift valve unit 490 in the downshift position. This permits normal operation of the splitter shift valve unit 490. Though the drive signal line 435 is also connected to exhaust in intermediate and low ranges, the splitter shift valve unit 490 operates in the normal manner since fluid is not in these ranges supplied to the high clutch line 210.

At excessive speeds with the transmission operating in 6th ratio, a forced manual downshift to 5th gear hold range cannot be made since the 5th ratio downshift inhibitor valve 520 limits the pressure beyond orifice 525 in branch line 210' and bore 500 of valve 490 to a value insufficient to downshift the splitter shift valve 490 against the governor pressure. Thus the transmission will continue in 6th ratio drive range.

On a manual forced downshift of the manual valve 427 with the transmission operating in 6th ratio to low range, if the input speed is excessive for 5th ratio, all the inhibitor valves, the 5th ratio inhibitor valve 520, 4th ratio inhibitor valve 627 and 2nd ratio inhibitor valve 801, will operate to prevent a downshift to 5th ratio. If the speed is reduced to a safe value for 5th ratio, the 5th ratio inhibitor valve will permit a downshift to 5th ratio but the 4th and 2nd ratio inhibitor valves will prevent any further downshift. On further reduction of speed to a safe value for 4th ratio, the 4th ratio inhibitor valve will permit a downshift to 4th ratio but the second ratio inhibitor valve will prevent downshift to second ratio. On a still further reduction of speed, the 2nd ratio inhibitor valve will permit a downshift to 2nd ratio. Thus these inhibitor valves prevent excessive transmission input and engine speed to protect these components. Though the splitter shift valve 490 is controlled by intermediate shaft governor pressure line 220 and the intermediate high shift valve 570 by rear governor pressure in line 320, there is a determinable relationship between these governor pressures and input speed so the inhibitor pressures can be set to prevent excessive input speeds.

*Reverse*

The transmission is placed in reverse drive by positioning the manual valve 428 (FIG. 6) in reverse "R" position with the vehicle at rest.

The main line 340 regulated by pressure control unit 341 supplies oil in neutral via orificed line 439 to fill the reverse clutch line 310 and reverse motor at a low pressure limited by valve 438 to a value insufficient to engage reverse and via ratio change line 425 and splitter valve unit 490 to splitter 27 low line 150 to engage splitter low ratio. The secondary line 356 is connected by the lockup shift valve unit 445 and converter inlet line 100 to supply the converter to provide converter drive as in forward drives.

The manual valve in reverse position connects high, intermediate and low range lines 433, 432 and 434 to exhaust 437 to disengage high, intermediate and low ratios in the three speed unit and disconnects the reverse clutch line 310 from exhaust 436 and valve 438 and connects line 310 to ratio change line 425 to engage the reverse ratio device 81. The low intermediate valve unit 530 is not acted on by fluid but is held by spring 555 in the down or reverse position to connect line 220 to the controlled front governor line 521. Thus front governor pressure acts on plug 518 of splitter shift valve unit 490. The reverse clutch is quickly engaged because the motor was filled by orificed makeup line 439 and valve 438 which limited the pressure to a value insufficient to engage the clutch.

The splitter shift valve 490 is initially held by spring 502 in the low position connecting line 425 to the splitter low line 150 to provide a converter, splitter low, and reverse drive, R1. As in forward ratio when front governor pressure in line 220 upshifts the lockup shift valve 445, the lockup pressure in line 395 lifts plug 497 disconnecting spring 502 from the splitter shift valve and conditioning this valve for a governor pressure, supplied by line 521, versus throttle pressure, supplied by line 408, upshift to splitter high to provide a second reverse drive R2. During this shift, the lockup cutoff valve 465, trimmer valve 640 and exhaust valve 650, function in the same manner as in low range first to second forward ratio shift.

*Hydrodynamic brake control*

The brake is controlled by the valve unit 690 (FIG. 7). When the manual control mechanism is moved to apply the brake, the valve 691 moves to the left to the open position compressing spring 693. This movement of the valve 691 to the apply position gradually permits oil under pressure to flow in increasing volume from the cooler outlet line 714 via branch 697 and check valve 695 and secondary line 356 to brake inlet line 180 which is connected to brake chamber 25 approximately midway between the inner and outer radii of the chamber. The outlet line 181 connects a tangential opening in the outer wall of the brake chamber 25 so that the pumping effect of the brake provides a pressure in the outlet with valve 691 in the brake applied position, to cooler inlet line 703. Then the oil from the brake is cooled in cooler 711 and returned by cooler outlet lines 713 and 714 and also secondary line 356 will supply any additional oil requirements from pumps 106 and 321 to valve unit 690 and brake inlet line 180. Check valve 695 prevents line 356 feed oil reversely through line 714 which might occur when the brake is absorbing very little torque. Normally there will be flow from the cooler via line 714 to valve 690 and the return to the brake and cooler for an autocirculation system.

The brake capacity is regulated by variably positioning the valve 691 or by completely opening and closing the valve to regulate the volume of oil in the brake chamber to regulate the braking effort. A vehicle employing this transmission provides downhill hydraulic braking in all ratios but normally the transmission automatically upshifts as described above to 6th ratio in high range, 5th ratio in fifth gear range, to 4th ratio intermediate range, and to 2nd ratio in low range. Since the braking effort of a hydrodynamic brake increases approximately with the cube function of the speed, the brake will limit the vehicle speed to low value in low range, an intermediate value in intermediate range and a high value in 5th gear hold and a higher value in high range. Thus the operator can, after determining the vehicle load and the steepness of the grade, select the proper range to provide the braking effort required for a safe speed. This brake in combination with this transmission provides four ranges of hydrodynamic brake control which will enable an operator to descend grades without using the vehicle service or emergency friction brakes to provide greater safety and extend the life of the friction brakes.

Since the churn brake will absorb more torque than is delivered by the engine, the brake outlet pressure, which is proportional to the torque absorbed by the brake, is connected to regulator unit 341 to increase the line pressure for tighter engagement of the ratio establishing devices.

With the brake valve 690 in the brake off position, the line 714 is connected to line 356 to provide a converter auto-circulation system, and with valve 690 in the on position, line 74 is connected to line 180 for brake auto-circulation.

In order to facilitate reference to the drawing, the location of parts on the drawing has been indicated by terms such as, upper, lower, right, left, etc., but it will be understood that this is not a limitation since the location of the valves is not important. The terms low and slow ratio are equivalent and define a speed ratio lower than the high or fast ratio.

The above-described preferred embodiments are illustrative of the invention, which may be practiced in several modified forms within the terms of the appended claims.

We claim:
1. In a transmission;
 (a) an input and output;
 (b) a first gear unit having low and high fluid operated means providing low and high drive ratios and a second gear unit connected in series with said first gear unit between said input and output and said second gear unit having first and second fluid operated means operative to establish first and second drive operative in combination with said first gear unit to provide four speed ratios;
 (c) a source of fluid under pressure;
 (d) a first shift valve operative in a first position to connect said source to said low fluid operated means and operative in response to transmission speed in each of the ratios of said second gear unit to upshift said first shift valve to a second position connecting said source to said high fluid operated means;
 (e) a second shift valve operative in a first position to connect said source to said first fluid operated means and shiftable to a second position connecting said source to said second fluid operated means;
 (f) a manual valve operated in a first range position positioning said second shift valve in first position and permitting upshifting of said first shift valve to provide transmission operation in a first and second speed ratio, in a second range position providing for upshifting of said second shift valve and preventing upshifting of said first shift valve after the second shift valve has upshifted to provide first, second and third speed ratios and a drive range position permitting upshifting of said first and second shift valves to provide first through fourth speed ratios;

(g) means operative on a downshift of said manual valve from said drive range position to said second position to prevent downshifting of said first shift valve to first position at excessive transmission speeds;

(h) means operative on a downshift of said manual valve to first position to prevent downshifting of said second shift valve to first position to prevent downshifting to second speed ratio at excessive transmission speeds.

2. In a transmission;
(a) an input and output;
(b) a first gear unit having low and high fluid operated means providing low and high drive ratios and a second gear unit connected in series with said first gear unit between said input and output and said second gear unit having first and second fluid operated means operative to establish first and second drive operative in combination with said first gear unit to provide four speed ratios;
(c) a source of fluid under pressure;
(d) a first shift valve operative in a first position to connect said source to said low fluid operated means and operative in response to transmission speed in each of the ratios of said second gear unit to upshift said first shift valve to a second position connecting said source to said high fluid operated means;
(e) a second shift valve operative in a first position to connect said source to said first fluid operated means and shiftable in response to transmission speed to a second position connecting said source to said second fluid operated means;
(f) a manual valve operative in a first range position positioning said second shift valve in first position and permitting upshifting of said first shift valve to provide transmission operation in a first and second speed ratio, in a second range position permitting speed responsive operation of said second shift valve and preventing upshifting of said first shift valve after the second shift valve has upshifted to provide first, second and third speed ratios and a drive range position permitting upshifting of said first and second shift valves to provide first through fourth speed ratios;
(g) inhibitor means operative on a downshift of said manual valve from said drive range position to said second position to prevent downshifting of said first shift valve to first position at excessive transmission speeds;
(h) inhibitor means operative on a downshift of said manual valve to first position to prevent downshifting of said second shift valve to first position to prevent downshifting to second speed ratio at excessive transmission speeds; and
(i) one of said inhibitor means being operative to control the pressure of fluid supplied from said source by said manual valve at the shift valve to prevent said downshifting.

3. In a transmission;
(a) a first gear unit having low and high fluid operated means providing a low and a high drive ratio;
(b) a second gear unit connected in series with said first gear unit having first, second and third fluid operated means operative to establish first, second and third drive operative in combination with said first gear unit to provide six speed ratios;
(c) a source of fluid under pressure;
(d) a first shift valve operative in a first position to connect said source to said low fluid operated means and operative in response to transmission speed in each of the three ratios of said second gear unit to upshift said first shift valve to a second position connecting said source to said high fluid operated means;

(e) an intermediate high shift valve operative in a first position to connect said source to said second fluid operated means and shiftable in response to transmission speed to a second position connecting said source to said third fluid operated means;
(f) a low intermediate shift valve operative in a low position to connect said source to said first fluid operative means and shiftable to a second position to connect said source to said intermediate high shift valve;
(g) a manual valve operative in a low range position to hold said low intermediate shift valve in said low position and to permit shifting of said first shift valve to provide first and second speed ratios, to an intermediate range position positioning both said low intermediate shift valve and said intermediate high shift valve in intermediate position and permitting upshifting of said first shift valve to provide transmission operation in third and fourth speed ratios, in a fifth gear range position permitting speed responsive operation of said intermediate high shift valve and preventing upshifting of said first shift valve after the intermediate high shift valve has upshifted to provide third, fourth and fifth speed ratios and a drive range position permitting upshifting of said intermediate high shift valve and said first shift valve to provide third through sixth speed ratios;
(h) means operative on a downshift of said manual valve from said drive range position to said fifth gear hold position to prevent downshifting of said first shift valve to first position at excessive transmission speeds;
(i) means operative on a downshift of said manual to intermediate position to prevent downshifting of said intermedite high shift valve to first position to prevent downshifting to intermediate range fourth speed ratio at excessive transmission speeds;
(j) and means operative on a manual downshift of said manual valve to low position to prevent movement of said low intermediate valve to low position to establish low ratio at excessive transmission speed and permitting continued operation of said transmission in intermediate range.

4. In a transmission;
(a) an input; and output;
(b) a first gear unit having low and high fluid operated means providing low and high drive ratios and a second gear unit connected in series with said first gear unit between said input and output and said second gear unit having first, second and third fluid operated means operative to establish first, second and third drive operative in combination with said first gear unit to provide six speed ratios;
(c) a source of fluid under pressure;
(d) a first shift valve operative in a first position to connect said source to said low fluid operated means and operative in response to transmission speed in each of the three ratios of said second gear unit to upshift said first shift valve to a second position connecting said source to said high fluid operated means;
(e) an intermediate high shift valve operative in a first position to connect said source to said second fluid operated means and shiftable in response to transmission speed to a second position connecting said source to said third fluid operated means;
(f) a low intermediate shift valve operative in a low position to connect said source to said first fluid operative means and shiftable to a second position to connect said source to said intermediate high shift valve;
(g) a manual valve operative in a low range position to hold said low intermediate shift valve in said low position and to permit shifting of said first shift valve to provide first and second speed ratios, to an intermediate range position positioning both said low intermediate shift valve and said intermediate high shift valve in intermediate position and permitting upshifting of said first shift valve to provide transmission operation in third and fourth speed ratios, in a fifth gear range position permitting speed responsive operation of said intermediate high shift valve and preventing upshifting of said first shift valve after the intermediate high shift valve has upshifted by connecting the fluid pressure supplied to said third fluid operated means to hold said first shift valve in a downshift position to provide third, fourth and fifth speed ratios and a drive range position permitting upshifting of said intermediate high shift valve and said first shift valve to provide third through sixth speed ratios;

(h) means operative on a downshift of said manual valve from said drive range position to said fifth gear hold position to limit the pressure supplied to said first shift valve from said third fluid operated means without affecting the pressure supplied to said third fluid operated means to a predetermined regulated pressure to prevent downshifting of said first shift valve to first position at excessive transmission speed;

(i) means operative on a downshift of said manual to intermediate position to connect said source to said intermediate high shift valve at a predetermined regulated pressure to prevent downshifting of said intermediate high shift valve to first position to prevent downshifting to intermediate range fourth speed ratio at excessive transmission speeds;

(j) and means operative on a manual downshift of said manual valve to low position to block the supply of fluid from said source via said manual valve to said low intermediate valve to prevent movement of said low intermediate valve to low position to establish low ratio at excessive transmission speeds and permitting continued operation of said transmission in intermediate range.

5. In a transmission;
(a) an input; and output;
(b) a first gear unit having low and high fluid operated means providing low and high drive ratios and a second gear unit connected in series with said first gear unit between said input and output and said second gear unit having first, second and third fluid operated means operative to establish first, second and third drive operative in combination with said first gear unit to provide six speed ratios;
(c) a source of fluid under pressure;
(d) a first shift valve operative in a first position to connect said source to said low fluid operated means and operative in response to transmission speed in each of the three ratios of said second gear unit to upshift said first shift valve to a second position connecting said source to said high fluid operated means;
(e) an intermediate high shift valve operative in a first position to connect said source to said second fluid operated means and shiftable in response to transmission speed to a second position connecting said source to said third fluid operated means;
(f) a low intermediate shift valve operative in a low position to connect said source to said first fluid operative means and shiftable to a second position to connect said source to said intermediate high shift valve;
(g) a manual valve operative in a low range position to hold said low intermediate shift valve in said low position and to permit shifting of said first shift valve to provide first and second speed ratios, to an intermediate range position positioning both said low intermediate shift valve and said intermediate high shift valve in intermediate position and permitting upshifting of said first shift valve to provide transmission operation in third and fourth speed ratios, in a fifth gear range position permitting speed responsive operation of said intermediate high shift valve and preventing upshifting of said first shift valve after the intermediate high shift valve has upshifted to provide third, fourth and fifth speed ratios and a drive range position permitting upshifting of said intermediate high shift valve and said first shift valve to provide third through sixth speed ratios;

(h) means operative on a downshift of said manual valve from said drive range position to said fifth gear hold position to connect said source to said first shift valve at a predetermined regulated pressure to prevent downshifting of said first shift valve to first position at excessive transmission speeds;

(i) means operative on a downshift of said manual to intermediate position to connect said source to said intermediate high shift valve at a predetermined regulated pressure to prevent downshifting of said intermediate high shift valve to first position to prevent downshifting to intermediate range fourth speed ratio at excessive transmission speeds;

(j) and means operative on a manual downshift of said manual valve to low position to block the supply of fluid from said source via said manual valve to said low intermediate valve to prevent movement of said low intermediate valve to low position to establish low ratio at excessive transmission speeds and permitting continued operation of said transmission in intermediate range.

6. In a transmission;
(a) an input; and output;
(b) a first gear unit having low and high fluid operated means providing low and high drive ratios and a second gear unit connected in series with said first gear unit between said input and output and said second gear unit having first, second and third fluid operated means operative to establish first, second and third drive operative in combination with said first gear unit to provide six speed ratios;
(c) a source of fluid under pressure, normal downshift means providing a downshift force and governor means providing a governor force proportional to transmission speed;
(d) a first shift valve urged by said downshift means to and operative in a first position to connect said source to said low fluid operated means and operative in response to said governor means at a transmission speed in each of the three ratios of said second gear unit to upshift said first shift valve to a second position connecting said source to said high fluid operated means and including a downshift control chamber;
(e) an intermediate high shift valve urged by said downshift means to and operative in a first position to connect said source to said second fluid operated means and shiftable in response to said governor means at a transmission speed to a second position connecting said source to said third fluid operated means and including a downshift control chamber;
(f) a low intermediate shift valve operative in a low position to connect said source to said first fluid operative means and shiftable to a second position to connect said source to said intermediate high shift valve and including a downshift control chamber;
(g) a manual valve operative in a low range position to hold said low intermediate shift valve in said low position and to permit shifting of said first shift valve to provide first and second speed ratios, to an intermediate range position positioning both said low intermediate shift valve and said intermediate high shift valve in intermediate position and permitting upshifting of said first shift valve to provide transmission operation in third and fourth speed ratios, in a fifth gear range position permitting speed responsive operation of said intermediate high shift valve and preventing upshifting of said first shift valve after the intermediate high shift valve has upshifted to provide third, fourth and fifth speed ratios and a drive range position permitting upshifting of said intermediate high shift valve and said first shift valve to provide third through sixth speed ratios;

(h) means operative on a downshift of said manual valve from said drive range position to said fifth gear hold position connect said source to said first shift valve control chamber and to regulate the pressure therein at a predetermined value in relation to said downshift and governor forces acting on said first shift valve to prevent downshifting of said first shift valve to first position at excessive transmission speeds permitting continued operation in any higher range;

(i) means operative on a downshift of said manual to intermediate position to connect said source to said intermediate high shift valve control chamber and to regulate the pressure therein at a predetermined value in relation to said downshift and governor forces acting on said intermediate high shift valve to prevent downshifting of said intermediate high shift valve to first position to prevent downshifting to intermediate range fourth speed ratio at excessive transmission speeds permitting continued operation in any higher range;

(j) and means operative on a manual downshift of said manual valve to low position to block the supply of fluid from said source via said manual valve to said low intermediate valve to prevent movement of said low intermediate valve to low position to establish low ratio at excessive transmission speeds and permitting continued operation of said transmission in any higher range.

7. In a transmission;
(a) an input and output;
(b) a first gear unit having low and high fluid operated means providing low and high drive ratios and a second gear unit connected in series with said first gear unit between said input and output and said second gear unit having first and second fluid operated means operative to establish first and second drive operative in combination with said first gear unit to provide four speed ratios;
(c) a source of fluid under pressure;
(d) a first shift valve operative in a first position to connect said source to said low fluid operated means and operative in response to transmission speed in each of the ratios of said second gear unit to upshift said first shift valve to a second position connecting said source to said high fluid operated means;
(e) a second shift valve operative in a first position to connect said source to said first fluid operated means and shiftable to a second position connecting said source to said second fluid operated means;
(f) a manual valve operative in a first range position positioning said second shift valve in first position and permitting upshifting of said first shift valve to provide transmission operation in a first and second speed ratio, in a second range position upshifting said second shift valve to provide first through fourth speed ratios;
(g) inhibiting means operative on a downshift of said manual to first position to prevent downshifting of said second shift valve to first position to prevent downshifting to second speed ratio at excessive transmission speeds.

8. In a transmission; a gear unit having drive establishing means providing low and high drive ratios; a source of fluid under a regulated pressure; normal downshift means providing a downshift force; governor means providing a governor force proportional to transmission speed; shift means operatively connected to said drive establishing means operative in a downshift position to establish said low ratio drive and in an upshift position to establish said high ratio drive and normally positioned by said downshift force means in said downshift position and shifted by said governor means at a higher speed to said upshift position; control means connected to said shift means operative in response to fluid pressure to downshift said shift means; manual valve means operative on movement from a higher to a lower position to operatively connect said source pressure to supply fluid under pressure to said control means and inhibiting means operative to control the pressure value of the fluid under pressure supplied to said control means at a value related to said downshift force and said governor force to prevent a manual downshift at excessive speeds and to provide a downshift at less than said excessive speeds.

9. The invention defined in claim 8 and said normal downshift means providing a force varying with torque demand.

10. In a transmission; a gear means having fluid operated means for establishing a low and a high drive ratio; a source of fluid at a regulated pressure value; normal downshift means providing a downshift force; governor means providing a governor force proportional to transmission speed; shift valve means for controlling the supply of fluid from said source to said fluid operated means and the exhaust of fluid from said fluid operated means normally urged by said normal downshift means to a first position to control the connection of said source to said fluid operated means to establish said low ratio drive and upshifted by said governor means at a higher transmission speed to a second position to connect said source to said fluid operated means to establish said high ratio drive; control means connected to said shift valve means operative in response to fluid pressure to downshift said shift valve means; manual valve means operative on movement from a higher to a lower position to connect said source pressure at said regulated pressure to said control means and inhibiting means operative to control the pressure value of the fluid supplied to said control means at a value related to said downshift force and said governor force to prevent a manual downshift at excessive speeds and to provide a downshift at less than said excessive speeds.

11. The invention defined in claim 10 and said normal downshift means providing a force varying with torque demand and a manual downshift at a speed between said higher speed and said excessive speed.

12. The invention defined in claim 10 and said manual valve means controlling the supply of fluid from said source at said regulated pressure value to said shift valve means for operation of said fluid operated means.

13. The invention defined in claim 10 and a relay valve actuated by said manual valve connecting said source to said control means.

14. The invention defined in claim 10 and said gear means having additional fluid operated means for establishing an additional drive ratio; additional shift valve means for controlling the connection of said source from said manual valve to said additional fluid operated means and to said control means.

15. The invention defined in claim 7 and said second shift valve being shiftable in response to speed, said manual valve connecting said source to said second shift valve to downshift said second shift valve, said inhibiting means controlling the pressure acting on said second shift valve without changing the source pressure to prevent downshifts at excessive speeds.

(References on following page)

References Cited by the Examiner

UNITED STATES PATENTS

| | | | |
|---|---|---|---|
| 2,697,363 | 12/1954 | Sheppard | 74—472 |
| 2,732,727 | 1/1956 | Livermore | 74—472 |
| 2,757,552 | 8/1956 | English | 74—472 |
| 2,895,344 | 7/1959 | Holdeman et al. | 74—472 |
| 2,926,543 | 3/1960 | Holdeman et al. | 74—761 X |
| 2,950,629 | 8/1960 | Holdeman et al. | 74—472 |
| 3,000,230 | 9/1961 | Froslie | 74—472 |
| 3,049,937 | 8/1962 | Lindsay | 74—472 |
| 3,096,666 | 7/1963 | Christenson et al. | 74—645 |
| 3,167,970 | 2/1965 | Wagner et al. | 74—472 |
| 3,181,677 | 5/1965 | Fisher et al. | 192—4 |

MARK NEWMAN, *Primary Examiner.*

DAVID J. WILLIAMOWSKY, *Examiner.*

J. R. BENEFIEL, *Assistant Examiner.*

UNITED STATES PATENT OFFICE
CERTIFICATE OF CORRECTION

Patent No. 3,313,183                                      April 11, 1967

Keith A. Bailey et al.

It is hereby certified that error appears in the above numbered patent requiring correction and that the said Letters Patent should read as corrected below.

Column 6, lines 40 and 46, for "441", each occurrence, read -- 411 --; column 17, line 53, for "factory" read -- factor --; column 41, line 12, for "position" read -- position to --.

Signed and sealed this 18th day of June 1968.

(SEAL)
Attest:

Edward M. Fletcher, Jr.

Attesting Officer

EDWARD J. BRENNER

Commissioner of Patents